United States Patent
Wen et al.

(10) Patent No.: US 10,153,851 B2
(45) Date of Patent: Dec. 11, 2018

(54) TRANSMISSION METHOD AND APPARATUS

(71) Applicant: Huawei Technologies Co., Ltd., Shenzhen, Guangdong (CN)

(72) Inventors: Ronghui Wen, Beijing (CN); Mingyu Zhou, Shenzhen (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 15/152,340

(22) Filed: May 11, 2016

(65) Prior Publication Data

US 2016/0254869 A1 Sep. 1, 2016

Related U.S. Application Data

(63) Continuation of application No. PCT/CN2014/082694, filed on Jul. 22, 2014.

(30) Foreign Application Priority Data

Nov. 12, 2013 (CN) .......................... 2013 1 0561398

(51) Int. Cl.
*H04B 15/00* (2006.01)
*H04L 5/00* (2006.01)
(Continued)

(52) U.S. Cl.
CPC .......... *H04B 15/00* (2013.01); *H04J 11/0023* (2013.01); *H04L 5/0073* (2013.01);
(Continued)

(58) Field of Classification Search
None
See application file for complete search history.

(56) References Cited

U.S. PATENT DOCUMENTS

2007/0184782 A1 8/2007 Sahota et al.
2009/0046800 A1* 2/2009 Xu ....................... H04B 7/0617
375/267
(Continued)

FOREIGN PATENT DOCUMENTS

CN 101001136 A1 7/2007
CN 101350801 A1 1/2009
(Continued)

OTHER PUBLICATIONS

"Further Discussion on Subframe-Set Dependent ICIC", NTT Docomo, 3GPP TSG RAN WG1 Meeting #74bis, Oct. 7-11, 2013, 9 pages, R1-134489.

(Continued)

*Primary Examiner* — Kodzovi Acolatse

(57) ABSTRACT

Embodiments of the present invention disclose a transmission method, where includes: a receiver receives a communication signal, where the communication signal includes an uplink signal and a downlink signal that are transmitted on a same time-frequency resource, the uplink signal and the downlink signal use a same carrier mapping manner; and performs interference cancellation on the communication signal according to the first multiple access manner and the second multiple access manner. In the embodiments of the present invention, an uplink signal and a downlink signal that are transmitted on a same time-frequency resource use a same carrier mapping manner. In this way, after a new technology is introduced, a problem that carrier mapping manners of an uplink signal and a downlink signal that are on a same time-frequency resource are different can be overcome, which helps a receiver of a communication signal perform interference cancellation.

18 Claims, 14 Drawing Sheets

(51) Int. Cl.
*H04J 11/00* (2006.01)
*H04L 25/02* (2006.01)
*H04L 27/26* (2006.01)
*H04L 5/14* (2006.01)

(52) U.S. Cl.
CPC .......... *H04L 5/1423* (2013.01); *H04L 5/1461* (2013.01); *H04L 25/0202* (2013.01); *H04L 27/265* (2013.01); *H04L 27/2628* (2013.01); *H04L 5/0048* (2013.01)

(56) References Cited

U.S. PATENT DOCUMENTS

| | | |
|---|---|---|
| 2010/0142476 A1 | 6/2010 | Jiang et al. |
| 2011/0090854 A1 | 4/2011 | Montojo et al. |
| 2013/0194984 A1 | 8/2013 | Cheng et al. |
| 2013/0272170 A1* | 10/2013 | Chatterjee ............ H04W 28/02 370/280 |
| 2014/0328283 A1* | 11/2014 | Wan ..................... H04L 5/14 370/329 |
| 2015/0038183 A1* | 2/2015 | Callard ................ H04J 11/0056 455/501 |
| 2015/0055515 A1 | 2/2015 | Cheng et al. |
| 2015/0078281 A1* | 3/2015 | Kishiyama ............ H04W 48/18 370/329 |
| 2015/0148050 A1* | 5/2015 | Siomina ................ H04J 11/005 455/452.1 |

FOREIGN PATENT DOCUMENTS

| | | |
|---|---|---|
| CN | 103209415 A | 7/2013 |
| RU | 2417529 C2 | 4/2011 |
| WO | 2007/081182 A1 | 7/2007 |

OTHER PUBLICATIONS

"LTE Research on Channel Estimation of Long Term Evolution Uplink", Aug. 12, 2010, 80 pages.

* cited by examiner

TRANSMISSION METHOD AND APPARATUS

CROSS REFERENCE TO RELATED APPLICATIONS

This application is a continuation of International Application No. PCT/CN2014/082694, filed on Jul. 22, 2014, which claims priority to Chinese Patent Application No. 201310561398.1, filed on Nov. 12, 2013, both of which are incorporated herein by reference in their entireties.

TECHNICAL FIELD

The present invention relates to the field of wireless communications, and in particular, to a transmission method and apparatus.

BACKGROUND

An existing long term evolution (LTE) system supports a time division duplex (TDD) manner and a frequency division duplex (FDD) manner, an SC-FDMA manner is used in an uplink, and an OFDMA manner is used in a downlink. Therefore, uplink and downlink carrier mapping manners in the existing LTE system are different, and only one carrier mapping manner is used for communication on a same time-frequency resource.

To improve resource usage and reduce costs, new communications technologies, such as wireless backhaul, a full-duplex transceiver, and a dynamic TDD system, can be introduced in an existing LTE technology. The new communications technologies require that an uplink signal and a downlink signal coexist on a same time-frequency resource.

In implementation of the present invention-creation, after the new communications technologies are introduced, the uplink and downlink carrier mapping manners coexist on a same time-frequency resource, that is, different carrier mapping manners exist on a same time-frequency resource, which therefore adversely affects interference cancellation (IC) performed by a receiver of a communication signal.

SUMMARY

In view of this, an objective of embodiments of the present invention is to provide a transmission method and apparatus, to resolve the foregoing problem.

To implement the objective, the embodiments of the present invention provide the following technical solutions.

According to a first aspect of the embodiments of the present invention, a transmission method is provided, including:

receiving, by a receiver, a communication signal, where the communication signal includes an uplink signal and a downlink signal that are transmitted on a same time-frequency resource, the uplink signal and the downlink signal use a same carrier mapping manner, the uplink signal corresponds to a first multiple access manner, and the downlink signal corresponds to a second multiple access manner; and performing, by the receiver, interference cancellation on the communication signal according to the first multiple access manner and the second multiple access manner.

With reference to the first aspect, in a first possible implementation manner, the same carrier mapping manner is a downlink carrier mapping manner; and the receiving a communication signal includes: receiving the communication signal on a carrier that corresponds to the downlink carrier mapping manner; or the same carrier mapping manner is an uplink carrier mapping manner; and the receiving a communication signal includes: receiving the communication signal on a carrier that corresponds to the uplink carrier mapping manner.

With reference to the first aspect, in a second possible implementation manner, the uplink signal includes an uplink demodulation reference signal and an uplink data signal, and the downlink signal includes a downlink demodulation reference signal and a downlink data signal; and the uplink signal and the downlink signal use a resource element RE mapping manner of the downlink demodulation reference signal, and in the received communication signal, an RE location of the uplink demodulation reference signal is the same as an RE location of the downlink demodulation reference signal; or the uplink signal and the downlink signal use an RE mapping manner of the uplink demodulation reference signal, and in the received communication signal, an RE location of the downlink demodulation reference signal is the same as an RE location of the uplink demodulation reference signal.

With reference to the first aspect, in a third possible implementation manner, the uplink signal includes an uplink demodulation reference signal and an uplink data signal, and the downlink signal includes a downlink demodulation reference signal and a downlink data signal; and in the received communication signal, an RE location of the uplink demodulation reference signal is different from an RE location of the downlink demodulation reference signal, and in the received communication signal, downlink silencing/low power processing has been performed on the uplink signal, and uplink silencing/low power processing has been performed on the downlink signal.

With reference to the second possible implementation manner or the third possible implementation manner of the first aspect, in a fourth possible implementation manner, the interference cancellation includes:

performing discrete Fourier transform on the communication signal, to obtain a frequency-domain mixed received signal;

separating the uplink demodulation reference signal, the downlink demodulation reference signal, and a first data signal from the frequency-domain mixed received signal, where the first data signal includes the uplink data signal and the downlink data signal;

demodulating the first data signal according to a modulation scheme of the uplink signal or the downlink signal, to obtain an estimation value of an interference signal, where the interference signal is the uplink data signal or the downlink data signal;

deleting the estimation value of the interference signal from the first data signal, to obtain a second data signal; and demodulating the second data signal, to obtain data bits.

With reference to the fourth possible implementation manner of the first aspect, in a fifth possible implementation manner, the interference signal is the uplink data signal, the first multiple access is single carrier frequency division multiple access SC-FDMA, and the second multiple access is orthogonal frequency division multiple access OFDMA;

the demodulating the first data signal according to a modulation scheme of the uplink signal, to obtain an estimation value of an interference signal includes:

performing channel estimation according to the uplink demodulation reference signal, to obtain a first channel estimation value;

performing channel equalization according to the uplink demodulation reference signal and the first data signal, to obtain a first equalization result;

performing inverse discrete Fourier transform IDFT on the first equalization result, where the IDFT corresponds to the SC-FDMA manner;

demodulating, according to the modulation scheme of the uplink signal, a first equalization result on which IDFT has been performed, to obtain an uplink modulation signal estimation value; and multiplying the uplink modulation signal estimation value by the first channel estimation value, to obtain the estimation value of the interference signal; and the demodulating the second data signal includes:

performing channel estimation according to the downlink demodulation reference signal, to obtain a second channel estimation value;

performing channel equalization according to the downlink demodulation reference signal and the second data signal, to obtain a second equalization result;

demodulating the second equalization result according to the modulation scheme of the downlink signal, to obtain a downlink modulation signal estimation value; and performing channel decoding on the downlink modulation signal estimation value, to obtain data bits.

With reference to the fourth possible implementation manner of the first aspect, in a sixth possible implementation manner, the interference signal is the uplink data signal, the first multiple access is single carrier frequency division multiple access SC-FDMA, and the second multiple access is orthogonal frequency division multiple access OFDMA;

the demodulating the first data signal according to a modulation scheme of the downlink signal, to obtain an estimation value of an interference signal includes:

performing channel estimation according to the downlink demodulation reference signal, to obtain a second channel estimation value;

performing, channel equalization according to the downlink demodulation reference signal and the first data signal, to obtain a second equalization result;

demodulating the second equalization result according to the modulation scheme of the downlink signal, to obtain a downlink modulation signal estimation value; and multiplying the downlink modulation signal estimation value by the second channel estimation value, to obtain the estimation value of the interference signal; and the demodulating the second data signal includes:

performing channel estimation according to the uplink demodulation reference signal, to obtain a first channel estimation value;

performing channel equalization according to the uplink demodulation reference signal and the second data signal, to obtain a first equalization result;

performing IDFT on the first equalization result, where the IDFT corresponds to the SC-FDMA manner;

demodulating, according to the modulation scheme of the uplink signal, a first equalization result on which IDFT has been performed, to obtain an uplink modulation signal estimation value; and performing channel decoding on the uplink modulation signal estimation value, to obtain data bits.

According to a second aspect of the embodiments of the present invention, a transmission method is provided, including:

sending, by an uplink signal transmitter, an uplink signal, where the uplink signal uses a same carrier mapping manner as a downlink signal transmitted on a same time-frequency resource, the uplink signal corresponds to a first multiple access manner, and the downlink signal corresponds to a second multiple access manner.

With reference to the second aspect, in a first possible implementation manner, when the same carrier mapping manner is a downlink carrier mapping manner, before the uplink signal is sent, the method further includes: performing, by the uplink signal transmitter, continuous/discontinuous spectrum shifting, so that a carrier of the uplink signal is shifted to a carrier that corresponds to the downlink carrier mapping manner.

With reference to the first possible implementation manner of the second aspect, in a second possible implementation manner, the continuous/discontinuous spectrum shifting includes: shifting two halves of a continuous spectrum of the uplink signal from a central point to two sides by half a subcarrier width respectively, to obtain a discontinuous spectrum, where one subcarrier width is vacated at a center of the discontinuous spectrum.

With reference to the second aspect, in a third possible implementation manner, the uplink signal includes an uplink demodulation reference signal and an uplink data signal, and the downlink signal includes a downlink demodulation reference signal and a downlink data signal; and when the uplink signal and the downlink signal use a resource element RE mapping manner of the downlink demodulation reference signal, before the uplink signal is sent, the method further includes:

performing, by the uplink signal transmitter, processing of changing from uplink RE mapping to downlink RE mapping, so that in a communication signal received by a signal receiver, an RE location of the uplink demodulation reference signal is the same as an RE location of the downlink demodulation reference signal.

With reference to the second aspect, in a fourth possible implementation manner, the uplink signal includes an uplink demodulation reference signal and an uplink data signal, and the downlink signal includes a downlink demodulation reference signal and a downlink data signal; and when an RE location of the uplink demodulation reference signal is different from an RE location of the downlink demodulation reference signal, before the uplink signal is sent, the method further includes: performing, by the uplink signal transmitter, downlink silencing/low power processing.

With reference to the fourth possible implementation manner of the second aspect, in a fifth possible implementation manner, the processing of changing from uplink RE mapping to downlink RE mapping includes: transmitting, on an RE on which the downlink demodulation reference signal is transmitted, the uplink demodulation reference signal, and an orthogonal sequence used by the uplink demodulation reference signal is orthogonal to an orthogonal sequence of the downlink demodulation reference signal in a code division manner.

According to a third aspect of the embodiments of the present invention, a transmission method is provided, including:

sending, by a downlink signal transmitter, a downlink signal, where the downlink signal uses a same carrier mapping manner as an uplink signal transmitted on a same time-frequency resource, the uplink signal corresponds to a first multiple access manner, and the downlink signal corresponds to a second multiple access manner.

With reference to the third aspect, in a first possible implementation manner, when the same carrier mapping manner is an uplink carrier mapping manner, before the downlink signal is sent, the method further includes:

performing, by the downlink signal transmitter, discontinuous/continuous spectrum shifting, so that a carrier of the downlink signal is shifted to a carrier that corresponds to the uplink carrier mapping manner.

With reference to the first possible implementation manner of the third aspect, in a second possible implementation manner, the discontinuous/continuous spectrum shifting includes: shifting two halves of a discontinuous spectrum of the downlink signal from two sides to a central point by half a subcarrier width respectively, to obtain a continuous spectrum, where one subcarrier width is vacated at a center of the discontinuous spectrum.

With reference to the third aspect, the first possible implementation manner of the third aspect, or the second possible implementation manner of the third aspect, in a third possible implementation manner, the uplink signal includes an uplink demodulation reference signal and an uplink data signal, and the downlink signal includes a downlink demodulation reference signal and a downlink data signal; and when the uplink signal and the downlink signal use a resource element RE mapping manner of the uplink demodulation reference signal, before the downlink signal is sent, the method further includes: performing, by the downlink signal transmitter, processing of changing from downlink RE mapping to uplink RE mapping, so that in a communication signal received by a signal receiver, an RE location of the downlink demodulation reference signal is the same as an RE location of the uplink demodulation reference signal.

With reference to the third aspect, the first possible implementation manner of the third aspect, or the second possible implementation manner of the third aspect, in a fourth possible implementation manner, the uplink signal includes an uplink demodulation reference signal and an uplink data signal, and the downlink signal includes a downlink demodulation reference signal and a downlink data signal; and when an RE location of the uplink demodulation reference signal is different from an RE location of the downlink demodulation reference signal, before the downlink signal is sent, the method further includes: performing, by the downlink signal transmitter, uplink silencing/low power processing.

With reference to the third possible implementation manner of the third aspect, in a fifth possible implementation manner, the processing of changing from downlink RE mapping to uplink RE mapping includes: transmitting, on an RE on which the uplink demodulation reference signal is transmitted, the downlink demodulation reference signal, and an orthogonal sequence used by the downlink demodulation reference signal is orthogonal to an orthogonal sequence of the uplink demodulation reference signal in a code division manner.

According to a fourth aspect of the embodiments of the present invention, a transmission apparatus is provided, including:

a receiving unit, configured to receive a communication signal, where the communication signal includes an uplink signal and a downlink signal that are transmitted on a same time-frequency resource, the uplink signal and the downlink signal use a same carrier mapping manner, the uplink signal corresponds to a first multiple access manner, and the downlink signal corresponds to a second multiple access manner; and an interference cancellation unit, configured to perform interference cancellation on the communication signal according to the first multiple access manner and the second multiple access manner.

With reference to the fourth aspect, in a first possible implementation manner, when the same carrier mapping manner is a downlink carrier mapping manner, in terms of receiving the communication signal, the receiving unit is specifically configured to: receive the communication signal on a carrier that corresponds to the downlink carrier mapping manner; or when the same carrier mapping manner is an uplink carrier mapping manner, in terms of receiving the communication signal, the receiving unit is specifically configured to: receive the communication signal on a carrier that corresponds to the uplink carrier mapping manner.

With reference to the fourth aspect, in a second possible implementation manner, in terms of the interference cancellation, the interference cancellation unit is specifically configured to:

perform discrete Fourier transform on the communication signal, to obtain a frequency-domain mixed received signal;

separate the uplink demodulation reference signal, the downlink demodulation reference signal, and a first data signal from the frequency-domain mixed received signal, where the first data signal includes the uplink data signal and the downlink data signal;

demodulate the first data signal according to a modulation scheme of the uplink signal or the downlink signal, to obtain an estimation value of an interference signal, where the interference signal is the uplink data signal or the downlink data signal;

delete the estimation value of the interference signal from the first data signal, to obtain a second data signal; and demodulate the second data signal, to obtain data bits.

With reference to the second possible implementation manner of the fourth aspect, in a third possible implementation manner, the first multiple access is single carrier frequency division multiple access SC-FDMA, and the second multiple access is orthogonal frequency division multiple access OFDMA; and when the interference signal is the uplink data signal, in terms of demodulating the first data signal according to the modulation scheme of the uplink signal, to obtain the estimation value of the interference signal, the interference cancellation unit is specifically configured to:

perform channel estimation according to the uplink demodulation reference signal, to obtain a first channel estimation value;

perform channel equalization according to the uplink demodulation reference signal and the first data signal, to obtain a first equalization result;

perform inverse discrete Fourier transform IDFT on the first equalization result, where the IDFT corresponds to the SC-FDMA manner;

demodulate, according to the modulation scheme of the uplink signal, a first equalization result on which IDFT has been performed, to obtain an uplink modulation signal estimation value; and multiply the uplink modulation signal estimation value by the first channel estimation value, to obtain the estimation value of the interference signal; and in terms of demodulating the second data signal, the interference cancellation unit is specifically configured to:

perform channel estimation according to the downlink demodulation reference signal, to obtain a second channel estimation value;

perform channel equalization according to the downlink demodulation reference signal and the second data signal, to obtain a second equalization result;

demodulate the second equalization result according to the modulation scheme of the downlink signal, to obtain a downlink modulation signal estimation value; and perform channel decoding on the downlink modulation signal estimation value, to obtain data bits; or when the interference signal is the downlink data signal, in terms of demodulating the first data signal according to the modulation scheme of the downlink signal, to obtain the estimation value of the interference signal, the interference cancellation unit is specifically configured to:

perform channel estimation according to the downlink demodulation reference signal, to obtain a second channel estimation value;

perform channel equalization according to the downlink demodulation reference signal and the first data signal, to obtain a second equalization result;

demodulate the second equalization result according to the modulation scheme of the downlink signal, to obtain a downlink modulation signal estimation value; and multiply the downlink modulation signal estimation value by the second channel estimation value, to obtain the estimation value of the interference signal; and in terms of demodulating the second data signal, the interference cancellation unit is specifically configured to:

perform channel estimation according to the uplink demodulation reference signal, to obtain a first channel estimation value;

perform channel equalization according to the uplink demodulation reference signal and the second data signal, to obtain a first equalization result;

perform IDFT on the first equalization result, where the IDFT corresponds to the SC-FDMA manner;

demodulate, according to the modulation scheme of the uplink signal, a first equalization result on which IDFT has been performed, to obtain an uplink modulation signal estimation value; and perform channel decoding on the uplink modulation signal estimation value, to obtain data bits.

According to a fifth aspect of the embodiments of the present invention, a transmission apparatus is provided, including: an uplink sending unit, configured to send an uplink signal, where the uplink signal uses a same carrier mapping manner as a downlink signal transmitted on a same time-frequency resource, the uplink signal corresponds to a first multiple access manner, and the downlink signal corresponds to a second multiple access manner.

With reference to the fifth aspect, in a first possible implementation manner, when the same carrier mapping manner is a downlink carrier mapping manner, the apparatus further includes: a continuous/discontinuous spectrum shifting unit, configured to perform continuous/discontinuous spectrum shifting before the uplink sending unit sends the uplink signal, so that a carrier of the uplink signal is shifted to a carrier that corresponds to the downlink carrier mapping manner.

With reference to the fifth aspect or the first possible implementation manner of the fifth aspect, in a second possible implementation manner, the uplink signal includes an uplink demodulation reference signal and an uplink data signal, and the downlink signal includes a downlink demodulation reference signal and a downlink data signal; and when the uplink signal and the downlink signal use a resource element RE mapping manner of the downlink demodulation reference signal, the apparatus further includes an uplink RE mapping to downlink RE mapping unit, configured to perform processing of changing from uplink RE mapping to downlink RE mapping before the uplink sending unit sends the uplink signal, so that in a communication signal received by a signal receiver, an RE location of the uplink demodulation reference signal is the same as an RE location of the downlink demodulation reference signal.

With reference to the fifth aspect or the first possible implementation manner of the fifth aspect, in a third possible implementation manner, the uplink signal includes an uplink demodulation reference signal and an uplink data signal, and the downlink signal includes a downlink demodulation reference signal and a downlink data signal; when an RE location of the uplink demodulation reference signal is different from an RE location of the downlink demodulation reference signal, the apparatus further includes a downlink silencing/low power unit, configured to perform downlink silencing/low power processing before the sending unit sends the uplink signal.

According to a sixth aspect of the embodiments of the present invention, a transmission apparatus is provided, including: a downlink sending unit, configured to send a downlink signal, where the downlink signal uses a same carrier mapping manner as an uplink signal transmitted on a same time-frequency resource, the uplink signal corresponds to a first multiple access manner, and the downlink signal corresponds to a second multiple access manner.

With reference to the sixth aspect, in a first possible implementation manner, when the same carrier mapping manner is an uplink carrier mapping manner, the apparatus further includes a discontinuous/continuous spectrum shifting unit, configured to perform discontinuous/continuous spectrum shifting before the downlink sending unit sends the downlink signal, so that a carrier of the downlink signal is shifted to a carrier that corresponds to the uplink carrier mapping manner.

With reference to the sixth aspect or the first possible implementation manner of the sixth aspect, in a second possible implementation manner, the uplink signal includes an uplink demodulation reference signal and an uplink data signal, and the downlink signal includes a downlink demodulation reference signal and a downlink data signal; when the uplink signal and the downlink signal use a resource element RE mapping manner of the uplink demodulation reference signal, the apparatus further includes a downlink RE mapping to uplink RE mapping unit, configured to perform processing of changing from downlink RE mapping to uplink RE mapping before the downlink sending unit sends the downlink signal, so that in a communication signal received by a signal receiver, an RE location of the downlink demodulation reference signal is the same as an RE location of the uplink demodulation reference signal.

With reference to the sixth aspect or the first possible implementation manner of the sixth aspect, in a third possible implementation manner, the uplink signal includes an uplink demodulation reference signal and an uplink data signal, and the downlink signal includes a downlink demodulation reference signal and a downlink data signal; when an RE location of the uplink demodulation reference signal is different from an RE location of the downlink demodulation reference signal, the apparatus further includes an uplink silencing/low power unit, configured to perform uplink silencing/low power processing before the downlink sending unit sends the downlink signal.

It can be seen that, in the embodiments of the present invention, an uplink signal and a downlink signal that are transmitted on a same time-frequency resource use a same carrier mapping manner. In this way, after a new technology is introduced, a problem that carrier mapping manners of an uplink signal and a downlink signal that are on a same time-frequency resource are different can be overcome, which helps a receiver of a communication signal perform interference cancellation.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
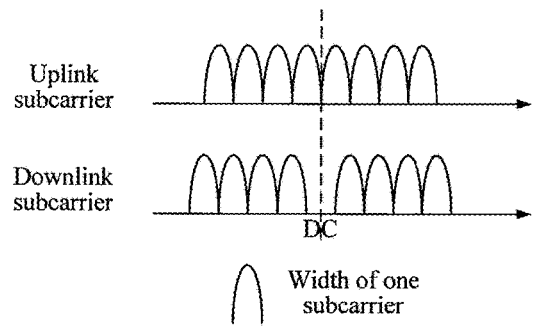
FIG. 1 shows uplink and downlink carrier mapping manners in an existing LTE technology according to an embodiment of the present invention.

In an existing LTE technology, an LTE system transmits only an uplink signal or a downlink signal on a same time-frequency resource. Referring to FIG. 1 (in which a horizontal coordinate is a frequency domain coordinate, and a vertical coordinate is frequency domain amplitude), in the existing LTE technology, on a resource block (RB), a single carrier frequency division multiple access (SC-FDMA) manner is used in an uplink, and subcarriers are continuous on a spectrum. An orthogonal frequency division multiple access (OFDMA) manner is used in a downlink, one subcarrier is vacated at a center of a spectrum and is not used, and the vacated subcarrier is a direct carrier (DC) component.

In implementation of the present invention-creation, many of new communications technologies, such as wireless backhaul, a full-duplex transceiver, and a dynamic TDD system, that are introduced to improve resource usage and reduce costs require that an uplink signal and a downlink signal coexist on a same time-frequency resource. It can be known from FIG. 1 that in the existing LTE technology, uplink and downlink carrier mapping manners are not aligned, and are staggered by half a subcarrier. Therefore, after an uplink signal and a downlink signal coexist on a same time-frequency resource, carrier mapping manners that are not aligned adversely affect subsequent interference cancellation (IC), and need to be optimized.

To perform optimization, the embodiments of the present invention provide a transmission method and apparatus.

It should be noted that an uplink signal transmitter, a downlink signal transmitter, and a signal receiver are involved in a process of transmitting an uplink signal and a downlink signal. Therefore, the transmission method may be executed by the uplink signal transmitter, the downlink signal transmitter, or the signal receiver. That is, the transmission apparatus may be the uplink signal transmitter, the downlink signal transmitter, or the signal receiver.

When the transmission method is executed by the uplink signal transmitter, the transmission method may include at least the following step:

sending an uplink signal, where the uplink signal uses a same carrier mapping manner as a downlink signal transmitted on a same time-frequency resource.

When the transmission method is executed by a downlink signal transmitter, the transmission method may include:

sending a downlink signal, where the downlink signal uses a same carrier mapping manner as an uplink signal transmitted on a same time-frequency resource.

Figure 2:
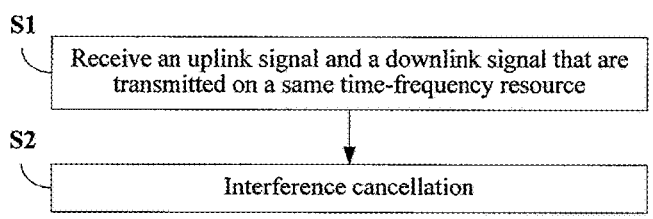
FIG. 2 is a flowchart of a transmission method according to an embodiment of the present invention.

When the transmission method is executed by the receiver, referring to FIG. 2, the transmission method may include at least:

S1: Receive a communication signal.

The received communication signal includes an uplink signal and a downlink signal that are transmitted on a same time-frequency resource, and the uplink signal and the downlink signal use a same carrier mapping manner. In addition, the uplink signal corresponds to a first multiple access manner, and the downlink signal corresponds to a second multiple access manner.

S2: Perform interference cancellation on the communication signal according to a first multiple access manner and a second multiple access manner.

Figure 3:
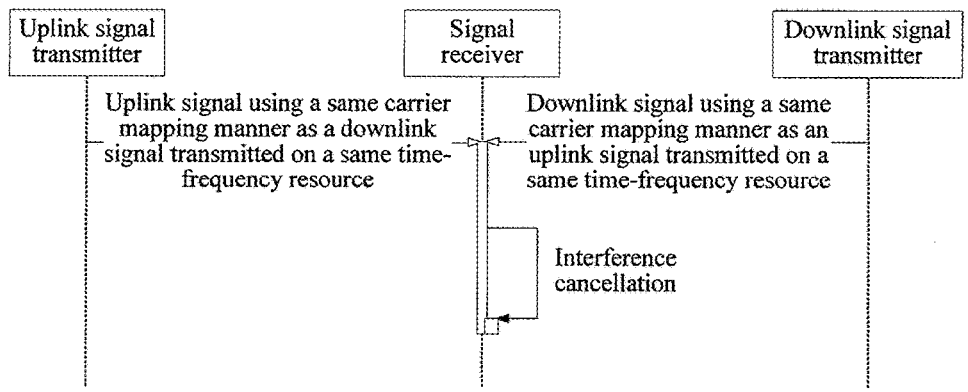
FIG. 3 is a flowchart of interaction according to an embodiment of the present invention.

For a process of interaction between the uplink signal transmitter, the downlink signal transmitter, and the signal receiver, reference may be made to FIG. 3.

In this embodiment, an uplink signal and a downlink signal that are received on a same time-frequency resource use a same carrier mapping manner, which therefore helps a signal receiver perform interference cancellation. How to perform interference cancellation is subsequently described in detail in this specification.

In another embodiment of the present invention, an uplink signal and a downlink signal that are transmitted on a same time-frequency resource in all the foregoing embodiments may use a same demodulation reference signal mapping manner, or may use different demodulation reference signal mapping manners, which is subsequently described in detail in this specification.

Figure 4:
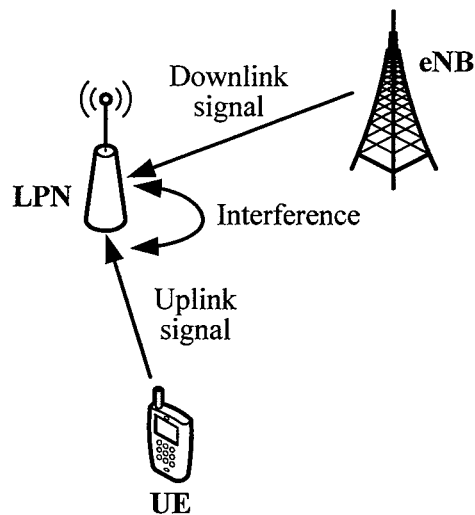
FIG. 4 is a scenario in which an uplink signal and a downlink signal coexist according to an embodiment of the present invention.

After a new communications technology is introduced, there may be the following several scenarios in which an uplink signal and a downlink signal coexist on a same time-frequency resource:

First scenario: Referring to FIG. 4, a low power node (LPN) receives, on a same time-frequency resource, an uplink signal sent by UE and a downlink signal sent by a base station (e.g. eNB).

Figure 5:
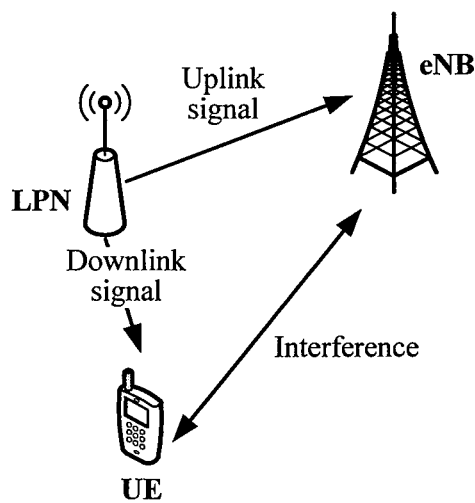
FIG. 5 is another scenario in which an uplink signal and a downlink signal coexist according to an embodiment of the present invention.

Second scenario: Referring to FIG. 5, an LPN sends, on a same time-frequency resource, a downlink signal to UE and an uplink signal to a base station (e.g. eNB).

Figure 6:
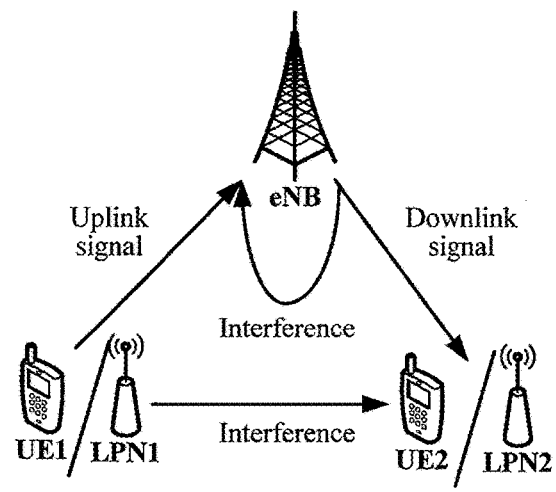
FIG. 6 is still another scenario in which an uplink signal and a downlink signal coexist according to an embodiment of the present invention.

Third scenario: Referring to FIG. 6, a base station (e.g. eNB) receives, on a same time-frequency resource, a downlink signal sent by UE 1 or an LPN 1 and sends a downlink signal to UE 2 or an LPN 2.

Figure 7:
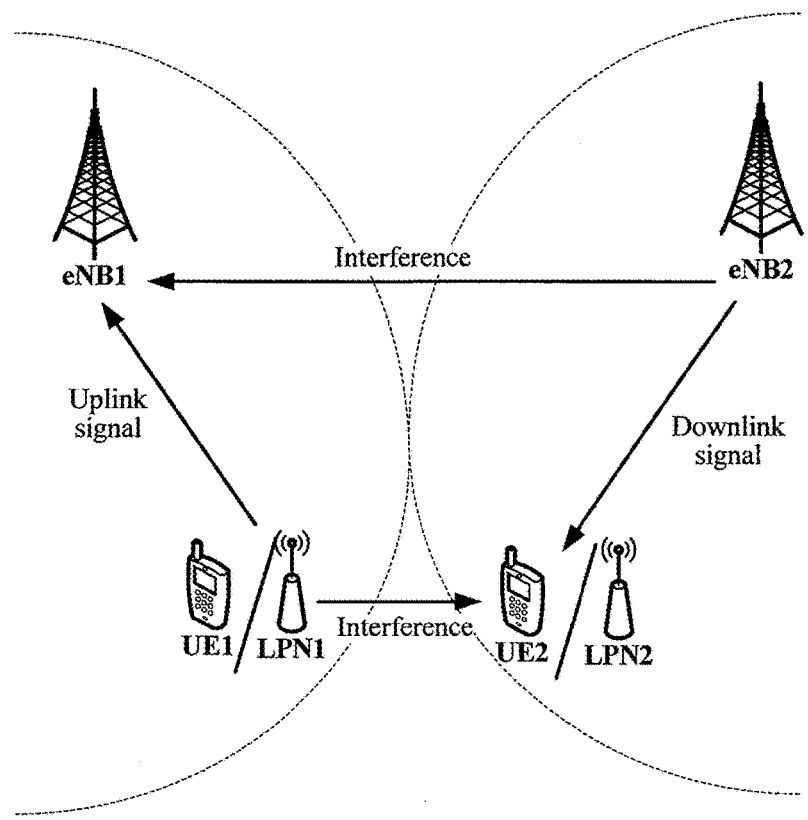
FIG. 7 is still another scenario in which an uplink signal and a downlink signal coexist according to an embodiment of the present invention.

Fourth scenario: Referring to FIG. 7, in a dynamic TDD system, service requirements of different cells may be different, resulting in different uplink-downlink subframe configurations of neighboring cells. In this case, on a same time-frequency resource, UE 1 or an LPN 1 sends an uplink signal to a first base station (e.g. eNB 1), and a second base station (e.g. eNB 2) sends a downlink signal to UE 2 or an LPN 2 in the neighboring cells.

The transmission method that the present invention intends to claim is described below in detail by using different scenarios. The first scenario is described first herein.

In the first scenario, still referring to FIG. 4, the LPN is used as a signal receiver (the LPN may act as a repeater or a base station), the UE is used as an uplink signal transmitter, and the eNB is used as a downlink signal transmitter. In this scenario, the first multiple access manner is SC-FDMA, and the second multiple access manner is OFDMA.

To perform optimization in terms of carrier mapping, the uplink signal and the downlink signal that are transmitted on the same time-frequency resource may use a same carrier mapping manner. For example, both the uplink signal and the downlink signal that are transmitted on the same time-frequency resource may use a downlink carrier mapping manner or use an uplink carrier mapping manner.

In this scenario, the LPN determines which carrier mapping manner is used by the uplink signal and the downlink signal that are transmitted on the same time-frequency resource.

When the uplink signal and the downlink signal that are transmitted on the same time-frequency resource use the downlink carrier mapping manner, because the UE sends the uplink signal in the uplink carrier mapping manner by default, before receiving the communication signal, the LPN further needs to notify the UE to perform continuous/discontinuous spectrum shifting.

That is, in this scenario, the transmission method corresponding to the signal receiver (the LPN) may further include: notifying the UE (the uplink signal transmitter) to perform continuous/discontinuous spectrum shifting on the uplink signal.

Correspondingly, before sending the uplink signal, the UE further needs to perform continuous/discontinuous spectrum shifting (according to the notification of the signal receiver), so that a carrier of the uplink signal is shifted to a carrier that corresponds to the downlink carrier mapping manner.

Figure 8:
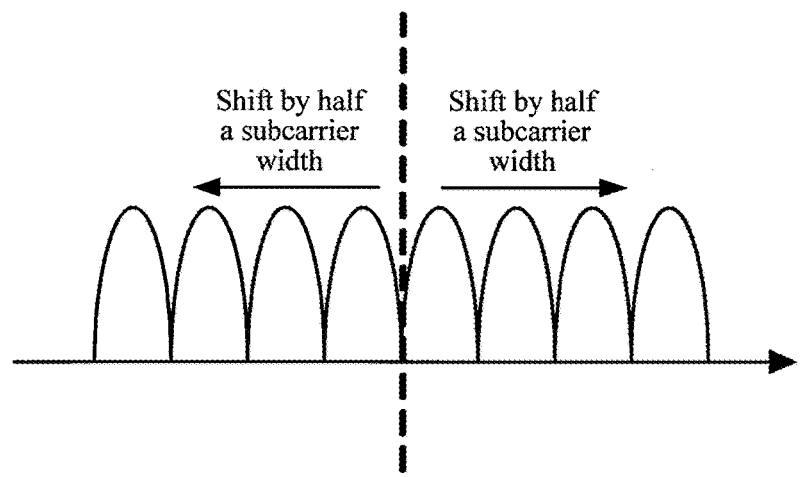
FIG. 8 is a schematic diagram of converting an uplink carrier mapping spectrum to a downlink carrier mapping spectrum by means of shifting according to an embodiment of the present invention.

An objective of the continuous/discontinuous spectrum shifting is to convert an uplink carrier mapping spectrum to a downlink carrier mapping spectrum by means of shifting. Referring to FIG. 8, more specifically, the continuous/discontinuous spectrum shifting may include: shifting two halves of a continuous spectrum (on the time-frequency resource) of the uplink signal from a central point to two sides by half a subcarrier width respectively, to obtain a discontinuous spectrum (referring to FIG. 9).

Figure 9:
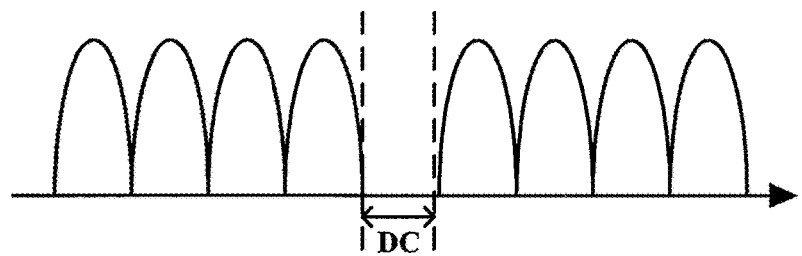
FIG. 9 is a schematic diagram after a downlink carrier mapping spectrum is obtained by means of shifting according to an embodiment of the present invention.

In this way, on a same RB, both the UE (the uplink signal transmitter) and the eNB (the downlink signal transmitter) use a downlink carrier mapping manner shown in FIG. 9 to send the uplink signal and the downlink signal, that is, the uplink signal and the downlink signal that are transmitted on the same time-frequency resource use the same carrier mapping manner.

Correspondingly, the "receiving a communication signal" performed by the LPN (the signal receiver) may specifically include: receiving the communication signal on the carrier that corresponds to the downlink carrier mapping manner.

When both the uplink signal and the downlink signal that are transmitted on the same time-frequency resource use the uplink carrier mapping manner, because the eNB sends the downlink signal in the downlink carrier mapping manner by default, before receiving the communication signal, the LPN further needs to notify the eNB to perform discontinuous/continuous spectrum shifting.

That is, in this scenario, the transmission method corresponding to the signal receiver (the LPN) may further include: notifying the eNB (the downlink signal transmitter) to perform discontinuous/continuous spectrum shifting on the downlink signal.

Correspondingly, before sending the downlink signal, the eNB further needs to perform discontinuous/continuous spectrum shifting on the downlink signal (according to the notification of the signal receiver), so that a carrier of the downlink signal is shifted to a carrier that corresponds to the uplink carrier mapping manner.

Figure 10:
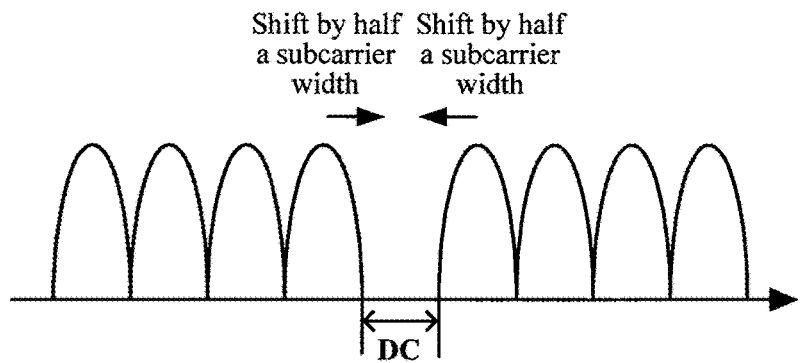
FIG. 10 is a schematic diagram of converting a downlink carrier mapping spectrum to an uplink carrier mapping spectrum by means of shifting according to an embodiment of the present invention.

An objective of the discontinuous/continuous spectrum shifting is to convert a downlink carrier mapping spectrum to an uplink carrier mapping spectrum by means of shifting. More specifically, referring to FIG. 10, the discontinuous/continuous spectrum shifting may include: shifting two halves of a discontinuous spectrum of the downlink signal from two sides to a central point by half a subcarrier width respectively, to obtain a continuous spectrum (referring to FIG. 11).

Figure 11:
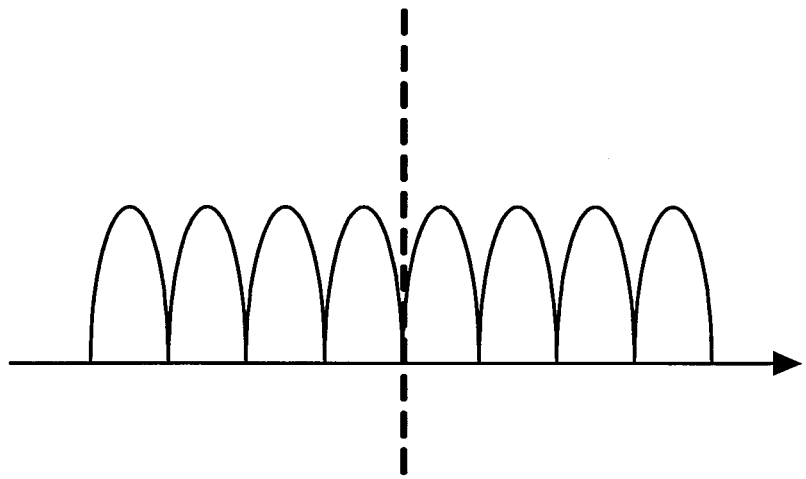
FIG. 11 is a schematic diagram after an uplink carrier mapping spectrum is obtained by means of shifting according to an embodiment of the present invention.

In this way, on a same RB, both the UE (the uplink signal transmitter) and the eNB (the downlink signal transmitter) use an uplink carrier mapping manner shown in FIG. 11 to send the uplink signal and the downlink signal, and therefore, it may be also implemented that the uplink signal and the downlink signal that are transmitted on the same time-frequency resource use the same carrier mapping manner.

Correspondingly, the "receiving" performed by the LPN (the signal receiver) may specifically include: performing receiving on the carrier that corresponds to the uplink carrier mapping manner.

The uplink signal may include an uplink demodulation reference (RS) signal and an uplink data signal, and the downlink signal may include a downlink demodulation reference (RS) signal and a downlink data signal.

Figure 12:
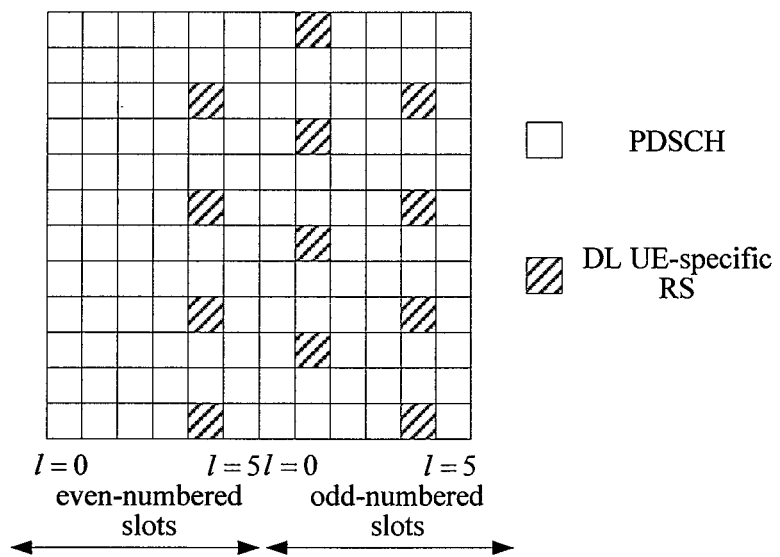
FIG. 12 is a schematic diagram of an RE mapping location of a downlink demodulation RS signal according to an embodiment of the present invention.

FIG. 12 shows an RE mapping location of a downlink demodulation RS signal on one RB. It should be noted that, in FIG. 12, a horizontal coordinate is a timeslot, a vertical coordinate is a subcarrier, a physical downlink shared channel (PDSCH) indicates that on this RE, a physical downlink shared channel is used to carry data that is from a transmission channel downlink shared channel (DSCH), that is, used to transmit a downlink data signal; a DL UE-specific RS indicates that a downlink demodulation reference signal is transmitted on this RE, even-numbered slots represent timeslots that are odd-numbered, and odd-numbered slots represent timeslots that are even-numbered.

Figure 13:
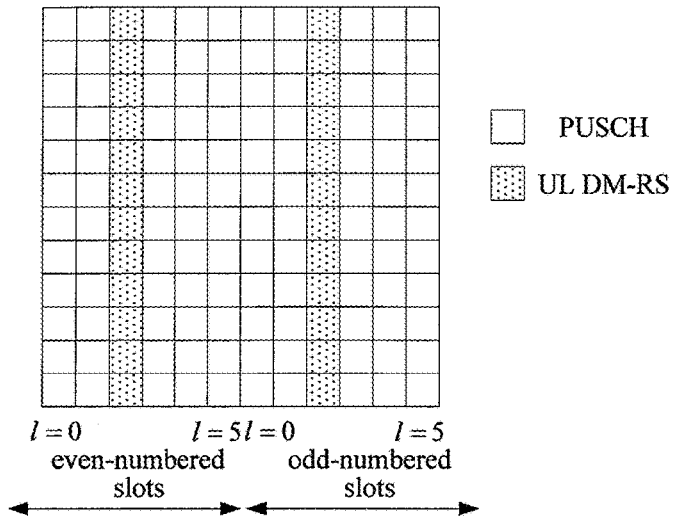
FIG. 13 is a schematic diagram of an RE mapping location of an uplink demodulation RS signal according to an embodiment of the present invention.

FIG. 13 shows an RE mapping location of an uplink demodulation RS signal on one RB. It should be noted that, in FIG. 13, a UL demodulation reference signal (DM-RS) indicates that an uplink demodulation reference signal is transmitted on this RE.

It should be noted that, to perform interference cancellation and signal demodulation, channel estimation needs to be performed first; to ensure accuracy of channel estimation, it is required that demodulation reference signals that are used to perform channel estimation and that are in various channels of signals are orthogonal to each other, or have very small mutual interference.

If two demodulation reference signals are on a same RE, different orthogonal sequences need to be allocated to the two demodulation reference signals, so as to ensure that the two orthogonal sequences are orthogonal in a code division manner; or if two demodulation reference signals are on different REs, they are certainly orthogonal.

In the existing LTE system, referring to FIG. 12 and FIG. 13, it can be known that the downlink demodulation RS signal and the uplink demodulation RS signal are on different REs (that is, the RE mapping location of the downlink demodulation RS signal and the RE mapping location of the uplink demodulation RS signal are staggered); therefore, the downlink demodulation RS signal and the uplink demodulation RS signal are orthogonal. After a new communications technology is introduced, and the uplink signal and the downlink signal coexist on the same time-frequency resource, the uplink demodulation RS signal is interfered by the downlink data signal, and the downlink demodulation RS signal is also interfered by the uplink data signal. This causes channel estimation to be inaccurate, thereby directly affecting interference cancellation and a demodulation result. Therefore, optimization needs to be performed.

To perform optimization in the aspect, the uplink signal and the downlink signal that are transmitted on the same time-frequency resource may use a same demodulation reference signal mapping manner. For example, both the uplink signal and the downlink signal use an RE mapping manner of the uplink demodulation reference signal or an RE mapping manner of the downlink demodulation reference signal.

In this scenario, the LPN determines which demodulation reference signal RE mapping manner is used by the uplink signal and the downlink signal that are transmitted on the same time-frequency resource. When both the uplink signal and the downlink signal use the RE mapping manner of the downlink demodulation reference signal, because the UE sends the uplink signal in the RE mapping manner of the uplink demodulation reference signal by default, before receiving the communication signal, the LPN further needs to notify the UE to perform processing of changing from uplink RE mapping to downlink RE mapping.

Correspondingly, before the uplink signal is sent, the transmission method performed by the UE may further include: performing processing of changing from uplink RE mapping to downlink RE mapping (according to the notification of the signal receiver), so that in the communication signal received by the receiver, an RE location of the uplink demodulation reference signal is the same as an RE location of the downlink demodulation reference signal.

More specifically, the processing of changing from uplink RE mapping to downlink RE mapping includes: transmitting, on a default RE on which the downlink demodulation reference signal is transmitted, the uplink demodulation reference signal (where in the LTE, the base station and the UE both know a default RE mapping location of the uplink demodulation reference signal and a default RE mapping location of the downlink demodulation reference signal).

It has been illustrated in the foregoing that if two demodulation reference signals are on a same RE, different orthogonal sequences need to be allocated to the two demodulation reference signals, so as to ensure that the orthogonal sequences are orthogonal in a code division manner. Therefore, the uplink demodulation reference signal further needs to use a new orthogonal sequence, and the (new) orthogonal sequence used by the uplink demodulation reference signal is orthogonal to an orthogonal sequence of the downlink demodulation reference signal in a code division manner. The RE mapping location and the orthogonal sequence of the downlink RS demodulation signal of the eNB do not need to be adjusted or updated. In this way, both the uplink signal and the downlink signal may be sent in a mapping manner in FIG. 12.

When both the uplink signal and the downlink signal use the RE mapping manner of the uplink demodulation reference signal, because the base station sends the downlink signal in the RE mapping manner of the downlink demodulation reference signal by default, before receiving the communication signal, the LPN further needs to notify the base station to perform processing of changing from downlink RE mapping to uplink RE mapping.

Correspondingly, before the downlink signal is sent, the transmission method performed by the base station may further include: performing processing of changing from downlink RE mapping to uplink RE mapping (according to the notification of the signal receiver), so that in the communication signal received by the signal receiver, an RE location of the downlink demodulation reference signal is the same as an RE location of the uplink demodulation reference signal.

More specifically, the processing of changing from downlink RE mapping to uplink RE mapping includes: transmitting, on a default RE on which the downlink demodulation reference signal is transmitted, the downlink demodulation reference signal, where a (new) orthogonal sequence used by the downlink demodulation reference signal is orthogonal to an orthogonal sequence of the uplink demodulation reference signal in a code division manner. The RE mapping location and the orthogonal sequence of the uplink RS demodulation signal of the UE do not need to be adjusted or updated. In this way, both the uplink signal and the downlink signal may be sent in a mapping manner in FIG. 13.

It should be noted that an orthogonal sequence set is stored in each of the base station and the UE. Therefore, a new orthogonal sequence can be selected from the orthogonal sequence set.

If the uplink signal and the downlink signal use different demodulation reference signal mapping manners, in the communication signal received by the receiver, an RE location of the uplink demodulation reference signal is different from an RE location of the downlink demodulation reference signal. That is, the RE mapping location of the downlink demodulation RS signal and the RE mapping location of the uplink demodulation RS signal are staggered.

Because in the existing LTE, the RE mapping location of the uplink demodulation RS signal and the RE mapping location of the downlink demodulation RS signal are originally staggered, the default RE mapping manner of the uplink demodulation RS signal and the default RE mapping manner of the downlink demodulation RS signal may be kept unchanged. That is, the base station still sends the downlink signal in the default RE mapping manner of the downlink demodulation reference signal, and the UE still sends the uplink signal in the default RE mapping manner of the uplink demodulation reference signal. Certainly, RE mapping locations of the uplink demodulation RS signal and the downlink demodulation RS signal may be reallocated and are made staggered, and details are not described herein.

When different demodulation reference signal mapping manners are used, to reduce interference to the uplink demodulation RS signal and the downlink demodulation RS signal, the LPN may perform the following operations:

notifying the UE to perform downlink silencing/low power processing; and notifying the base station to perform uplink silencing/low power processing.

That is, before sending the uplink signal, the UE further needs to perform downlink silencing/low power processing (according to the notification of the LPN).

Similarly, before sending the downlink signal, the base station further needs to perform uplink silencing/low power processing (according to the notification of the LPN).

In this way, in the communication signal received by the signal receiver, downlink silencing/low power processing has been performed on the uplink signal, and uplink silencing/low power processing has been performed on the downlink signal.

More specifically, the downlink silencing/low power processing may include: keeping silent or performing low-power transmitting on the RE on which the downlink demodulation reference signal is transmitted.

The uplink silencing/low power processing may include: keeping silent or performing low-power transmitting on the RE on which the uplink demodulation reference signal is transmitted.

Figure 14:
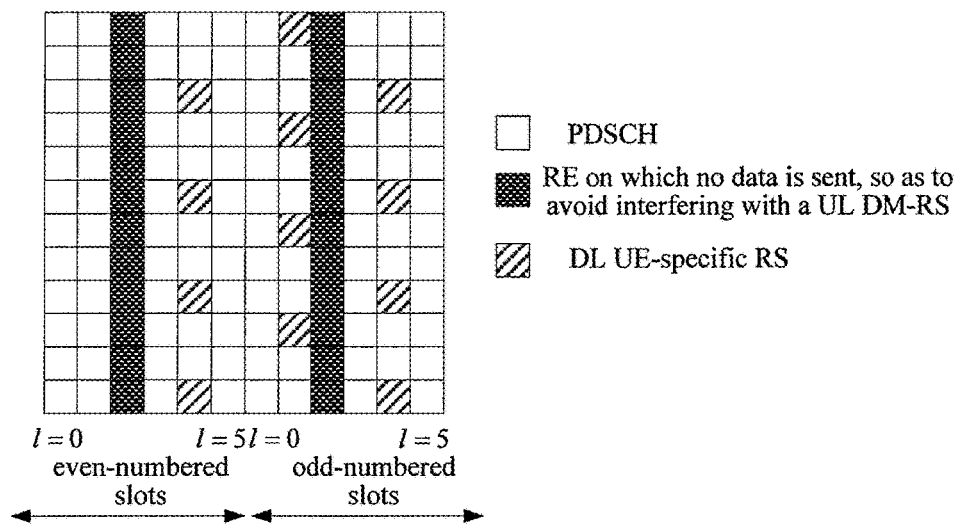
FIG. 14 is a schematic diagram of another RE mapping location of a downlink demodulation RS signal according to an embodiment of the present invention.

FIG. 14 shows a mapping location of a downlink demodulation reference signal on a side of a base station according to this embodiment. It can be seen that no PDSCH (downlink data signal) is sent at an RE location that corresponds to an uplink demodulation RS signal, silence is kept.

For convenience, the processing of changing from uplink RE mapping to downlink RE mapping, the processing of changing from downlink RE mapping to uplink RE mapping, the downlink silencing/low power processing, and the uplink silencing/low power processing may be collectively referred to as RE mapping processing. The continuous/discontinuous spectrum shifting and the discontinuous/continuous spectrum shifting are collectively referred to as spectrum shifting.

It should be noted that notifying, by the LPN, the UE or the eNB to perform spectrum shifting is mentioned in the foregoing. In this scenario, while notifying the UE or the eNB to perform spectrum shifting, the LPN may notify the UE or the eNB to perform RE mapping processing; or the notification may be also performed in two steps.

Correspondingly, when the uplink signal transmitter or the downlink signal transmitter not only needs to perform spectrum shifting, but also needs to perform RE mapping processing, the uplink signal transmitter or the downlink signal transmitter may perform RE mapping processing while performing spectrum shifting, or may first perform spectrum shifting and then perform RE mapping processing, or may first perform RE mapping processing and then perform spectrum shifting.

It should be further noted that adjustment of the carrier mapping manner and the demodulation reference signal mapping manner does not affect modulation schemes of the uplink signal and the downlink signal, the modulation scheme of the uplink signal is still a default modulation scheme, and similarly, the modulation scheme of the downlink signal is also still a default modulation scheme.

Interference cancellation (IC) is described below.

Conventional IC processing is performed on the premise that received two channels of signals use a same modulation scheme, and a case in which a receive end receives an uplink signal and a downlink signal at the same time is not considered. After a new communications technology is introduced, an uplink signal and a downlink signal coexist on a same time-frequency resource, and modulation schemes and multiple access manners of the uplink signal and the downlink signal may be different. In this way, IC needs to be optimized.

Figure 15:
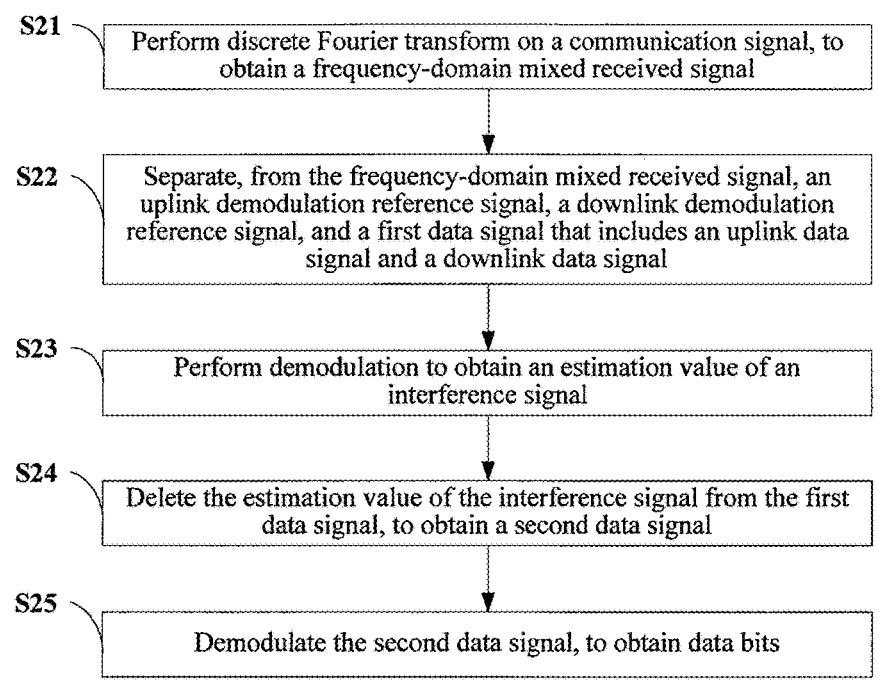
FIG. 15 is a flowchart of interference cancellation according to an embodiment of the present invention.

Referring to FIG. 15, in this embodiment of the present invention, the interference cancellation may include the following steps:

S21: Perform discrete Fourier transform (DTF) on the communication signal, to obtain a frequency-domain mixed received signal.

S22: Separate, from the frequency-domain mixed received signal, the uplink demodulation reference signal, the downlink demodulation reference signal, and a first data signal that includes an uplink data signal and a downlink data signal.

The signal receiver may separate, according to pre-acquired demodulation reference information of the uplink signal and the downlink signal, the uplink demodulation reference signal, the downlink demodulation reference signal, and the first data signal that includes the uplink data signal and the downlink data signal.

The demodulation reference information includes the RE locations of the uplink demodulation reference signal and the downlink demodulation reference signal. More specifically, a manner for separating the first data signal may include:

if both the uplink signal transmitter and the downlink signal transmitter use the RE mapping manner of the uplink demodulation reference signal, the RE locations of the uplink demodulation reference signal and the downlink demodulation reference signal are the same, and when data is separated, referring to FIG. 13, first data can be separated by removing only a signal at the RE location of the uplink demodulation reference signal. Similarly, if both the uplink signal transmitter and the downlink signal transmitter use the RE mapping manner of the downlink demodulation reference signal, when data is separated, referring to FIG. 12, first data can be separated by removing a signal at the RE location of the downlink demodulation reference signal.

If the received uplink and downlink demodulation RS signals use manners in which RE mapping locations thereof are staggered, first data can be separated by removing a signal at the RE location of the uplink demodulation reference signal and a signal at the RE location of the downlink demodulation reference signal.

S23: Demodulate the first data signal according to a modulation scheme of the uplink signal or the downlink signal, to obtain an estimation value of an interference signal.

S24: Delete the estimation value of the interference signal from the first data signal (subtracting the estimation value of the interference signal from the first data signal), to obtain a second data signal.

S25: Demodulate the second data signal, to obtain data bits (a wanted signal).

In different cases, the uplink data signal may be the interference signal, and the downlink data signal may be the wanted signal; or the downlink data signal may be the interference signal, and the uplink data signal may be the wanted signal.

Figure 16:
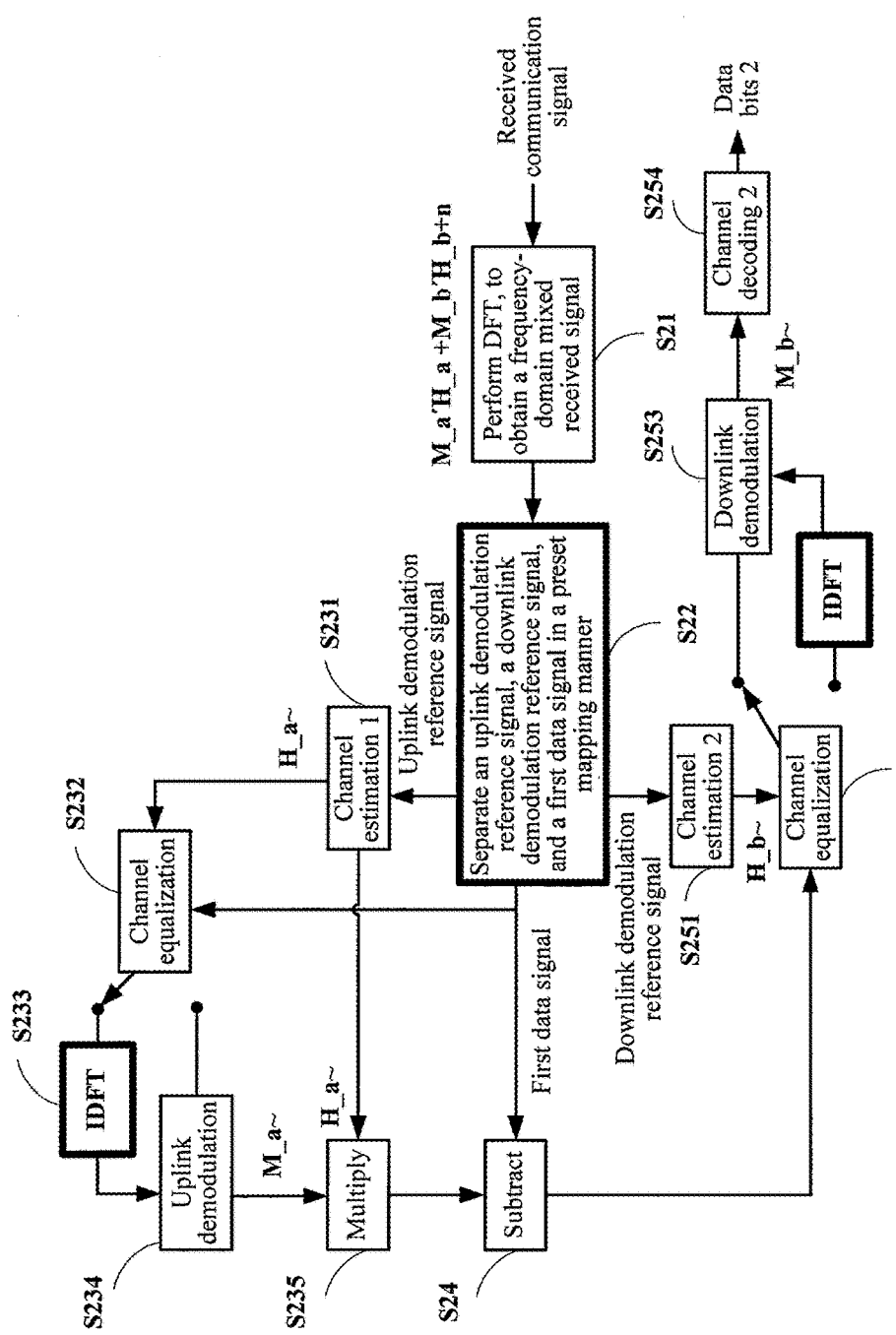
FIG. 16 is another flowchart of interference cancellation according to an embodiment of the present invention.

More specifically, referring to FIG. 16, when the interference signal is the uplink data signal, and the wanted signal is the downlink data signal, step S23 may include:

S231: Perform channel estimation (channel estimation 1) according to the separated uplink demodulation reference signal, to obtain a first channel estimation value H_a~.

How to perform channel estimation belongs to the prior art, and details are not described herein.

S232: Perform channel equalization according to the separated uplink demodulation reference signal and first data signal, to obtain a first equalization result.

How to perform channel equalization belongs to the prior art, and details are not described herein.

S233: Perform inverse discrete Fourier transform (IDFT) on the first equalization result.

How to perform IDFT is a prior art, and details are not described herein. It should be noted that IDFT needs to be performed, before demodulation, on a signal that corresponds to an SC-FDMA manner, and IDFT does not need to performed, before demodulation, on a signal that corresponds to an OFDMA manner.

S234: Demodulate, according to the modulation scheme of the uplink signal, a first equalization result on which IDFT has been performed, to obtain an uplink modulation signal estimation value M_a~ (uplink demodulation).

It should be noted that the signal receiver may determine, according to whether a received signal is the uplink signal or the downlink signal, a multiple access manner of the signal and whether to use IDFT. The modulation scheme is notified through signaling between the transmitter and the receiver.

How to perform demodulation belongs to the prior art, and details are not described herein.

S235: Multiply the uplink modulation signal estimation value by the first channel estimation value, to obtain the estimation value of the interference signal.

Correspondingly, step S25 (demodulating the second data signal) may include:

S251: Perform channel estimation (channel estimation 2) according to the separated downlink demodulation reference signal, to obtain a second channel estimation value H_b~.

Because demodulation reference signals of the uplink signal and the downlink signal are orthogonal, the first channel estimation value H_a~ and the second channel estimation value H_b~ can be accurately estimated.

S252: Perform channel equalization according to the separated downlink demodulation reference signal and the second data signal, to obtain a second equalization result.

S253: Demodulate the second equalization result according to the modulation scheme of the downlink signal, to obtain a downlink modulation signal estimation value M_b~ (downlink demodulation).

S254: Perform channel decoding on the downlink modulation signal estimation value, to obtain data bits (data bits 2).

It should be noted that because the downlink signal uses an OFDMA multiple access manner, IDFT does not need to be performed before demodulation.

For convenience, interference cancellation performed when the interference signal is the uplink data signal and the wanted signal is the downlink data signal may be referred to as first interference cancellation.

Figure 17:
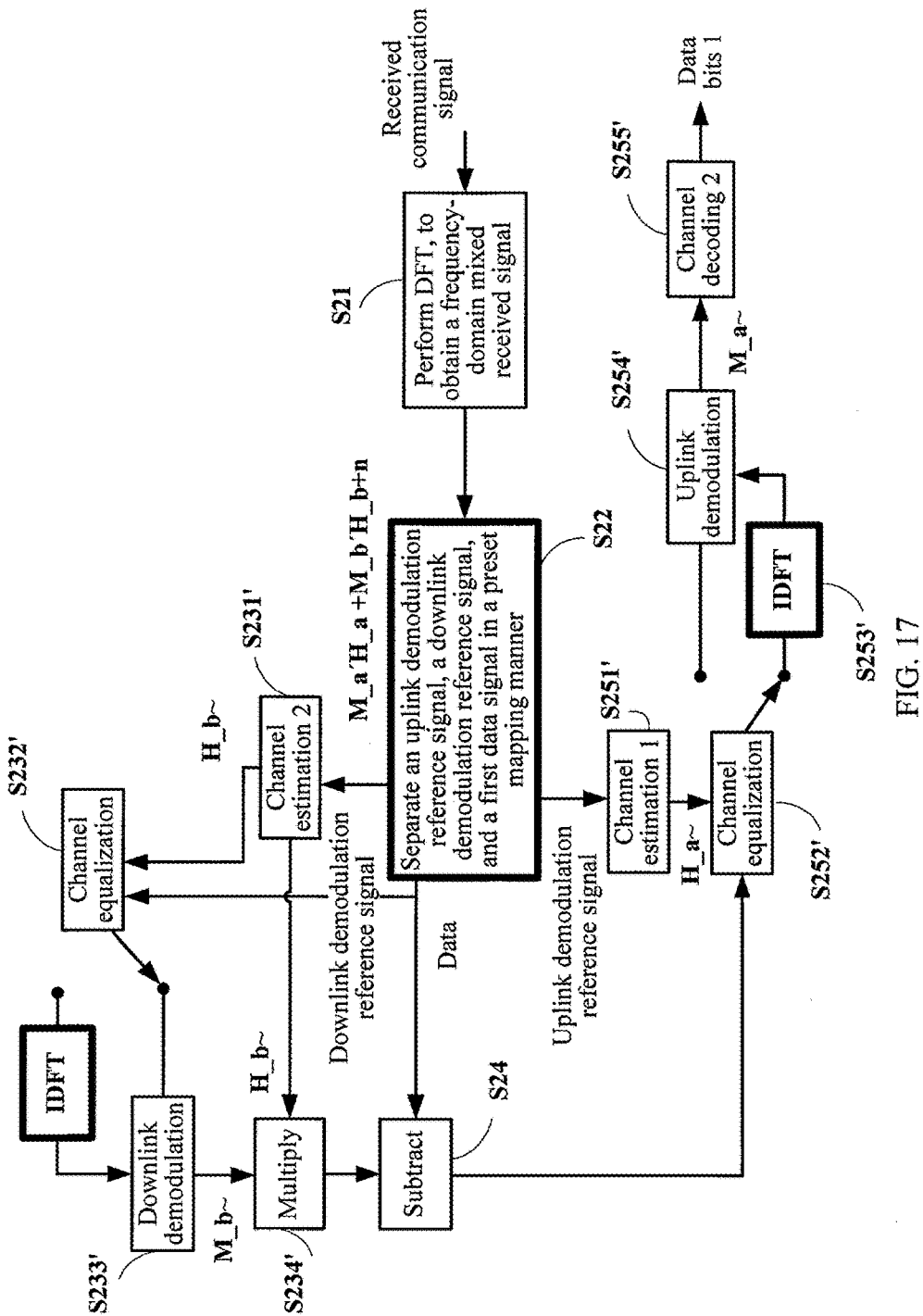
FIG. 17 is still another flowchart of interference cancellation according to an embodiment of the present invention.

When the interference signal is the downlink data signal, and the wanted signal is the uplink data signal, referring to FIG. 17, step S23 may include:

S231': Perform channel estimation (channel estimation 2) according to the downlink demodulation reference signal, to obtain a second channel estimation value H_b~.

S232': Perform channel equalization according to the separated downlink demodulation reference signal and first data signal, to obtain a second equalization result.

S233': Demodulate the second equalization result according to the modulation scheme of the downlink signal, to obtain a downlink modulation signal estimation value M_b~.

It should be noted that because the interference signal (the downlink data signal) uses an OFDMA multiple access manner, IDFT does not need to be performed during demodulation.

S234': Multiply the downlink modulation signal estimation value by the second channel estimation value, to obtain the estimation value of the interference signal.

Correspondingly, step S25 (demodulating the second data signal) may include:

S251': Perform channel estimation (channel estimation 1) according to the separated uplink demodulation reference signal, to obtain H_a~ (a first channel estimation value).

S252': Perform channel equalization according to the separated uplink demodulation reference signal and the second data signal, to obtain a first equalization result.

S253': Perform IDFT on the first equalization result.

S254': Demodulate, according to the modulation scheme of the uplink signal, a first equalization result on which IDFT has been performed, to obtain an uplink modulation signal estimation value M_a~.

S255': Perform channel decoding on the uplink modulation signal estimation value, to obtain data bits (data bits 1).

For convenience, interference cancellation performed when the interference signal is the downlink data signal and the wanted signal is the uplink data signal may be referred to as second interference cancellation.

The second scenario is described below. Still referring to FIG. 5, in the second scenario, the LPN uses a MU-MIMO (Multiple-User Multiple Input Multiple Output, multi-user multiple-input multiple-output) technology, and sends data to both the UE and the eNB (the LPN may act as a repeater or a base station). Therefore, in this scenario, the LPN is used as both an uplink signal transmitter and a downlink signal transmitter.

Because of multipath transmission and the like, in addition to the downlink signal, the UE may further receive the uplink signal. Similarly, in addition to the uplink signal, the eNB may further receive the downlink signal. That is, both the UE and the eNB are signal receivers.

In this scenario, the first multiple access manner is also SC-FDMA, and the second multiple access manner is also OFDMA.

Similar to the first scenario, to perform optimization in terms of carrier mapping, both an uplink signal and a downlink signal that are transmitted on a same time-frequency resource may use a downlink carrier mapping manner or an uplink carrier mapping manner.

Because the LPN is used as a transmitter of both the uplink signal and the downlink signal, if both the uplink signal and the downlink signal use the downlink carrier mapping manner, before sending the uplink signal, the LPN needs to perform continuous/discontinuous spectrum shifting.

In addition, because the eNB receives the uplink signal in the uplink carrier mapping manner by default, when both the uplink signal and the downlink signal use the downlink carrier mapping manner, before sending the uplink signal, the LPN further needs to notify the eNB to perform receiving on a carrier that corresponds to the downlink carrier mapping manner.

Correspondingly, for the eNB, the "receiving a communication signal" performed by the eNB as a signal receiver may specifically include: receiving (according to the notification of the LPN) the communication signal on the carrier that corresponds to the downlink carrier mapping manner.

If both the uplink signal and the downlink signal use the uplink carrier mapping manner, before sending the downlink signal, the LPN needs to perform discontinuous/continuous spectrum shifting.

In addition, because the UE receives the downlink signal in the downlink carrier mapping manner by default, when both the uplink signal and the downlink signal use the uplink carrier mapping manner, before sending the downlink signal, the LPN further needs to notify the UE to perform receiving on a carrier that corresponds to the uplink carrier mapping manner.

Correspondingly, for the UE, the "receiving a communication signal" performed by the UE as a signal receiver may specifically include: receiving (according to the notification of the LPN) the communication signal at the carrier that corresponds to the uplink carrier mapping manner.

For specific content of the continuous/discontinuous spectrum shifting and the discontinuous/continuous spectrum shifting, refer to the foregoing description in the specification, and details are not described herein.

Similar to the first scenario, a second scene, which needs to be optimized, in the second scenario lies in a demodulation reference signal mapping manner.

Similar to the foregoing, both the uplink signal and the downlink signal that are transmitted on the same time-frequency resource may use an RE mapping manner of an uplink demodulation reference signal or an RE mapping manner of a downlink demodulation reference signal.

When both the uplink signal and the downlink signal use the RE mapping manner of the downlink demodulation reference signal, before the uplink signal is sent, the transmission method performed by the LPN may further include: performing processing of changing from uplink RE mapping to downlink RE mapping.

When both the uplink signal and the downlink signal use the RE mapping manner of the uplink demodulation reference signal, before the downlink signal is sent, the transmission method performed by the LPN may further include: performing processing of changing from downlink RE mapping to uplink RE mapping.

For specific content of the processing of changing from uplink RE mapping to downlink RE mapping and the processing of changing from downlink RE mapping to uplink RE mapping, reference may be made to the foregoing description in the specification, and details are not described herein.

Alternatively, an RE mapping location of the downlink demodulation RS signal and an RE mapping location of the uplink demodulation RS signal may be kept staggered. In this case, before sending the downlink signal, the LPN further needs to perform uplink silencing/low power processing and downlink silencing/low power processing.

To better facilitate subsequent interference cancellation, the LPN may further notify the eNB to perform downlink silencing/low power processing (keeping silent or performing low-power transmitting on an RE on which the UE transmits the downlink demodulation reference signal), and notify the UE to perform uplink silencing/low power processing (keeping silent or performing low-power transmitting on an RE on which the eNB transmits the uplink demodulation reference signal).

For specific content of the uplink silencing/low power processing and the downlink silencing/low power processing, reference may be made to the foregoing description in the specification, and details are not described herein.

In addition, in the second scenario, interference cancellation further needs to be optimized. Because in this scenario, the LPN sends both the uplink signal and the downlink signal, the LPN needs to notify the UE and the base station of demodulation reference information (RE locations of the uplink demodulation reference signal and the downlink demodulation reference signal) and modulation schemes of the uplink signal and the downlink signal, so that the UE and the base station use the demodulation reference information and the modulation schemes during interference cancellation. The UE or the base station may determine, according to whether a received signal is the uplink signal or the downlink signal, a multiple access manner of the signal and whether to use IDFT.

For the eNB, an interference signal of the eNB is the downlink data signal, and a wanted signal of the eNB is the uplink data signal; therefore, the second interference cancellation needs to be performed.

For the UE, an interference signal of the UE is the uplink data signal, and a wanted signal of the UE is the downlink data signal; therefore, the first interference cancellation needs to be performed.

For related content of the first interference cancellation and the second interference cancellation, reference may be made to the foregoing description in the specification, and details are not described herein.

The third scenario is described below. Still referring to FIG. 6, in this scenario, the base station (eNB) is used as a downlink signal transmitter, the UE 1 or the LPN 1 (UE 1/LPN 1) is used as an uplink signal transmitter, and in this case, both the eNB and the UE 2 or LPN 2 are used as a signal receiver. In this scenario, the first multiple access manner is also SC-FDMA, and the second multiple access manner is also OFDMA.

Similar to the foregoing two scenarios, to perform optimization in terms of carrier mapping, both an uplink signal and a downlink signal that are transmitted on a same time-frequency resource may use a downlink carrier mapping manner or an uplink carrier mapping manner.

In this scenario, the eNB determines which carrier mapping manner is used by the uplink signal and the downlink signal that are transmitted on the same time-frequency resource; when both the uplink signal and the downlink signal use the downlink carrier mapping manner, because the UE 1 or the LPN 1 sends the uplink signal in the uplink carrier mapping manner by default, before receiving the communication signal, the eNB further needs to notify the UE 1 or the LPN 1 to perform continuous/discontinuous spectrum shifting.

For the UE 1 or the LPN 1, before sending the uplink signal, the UE 1 or the LPN 1 further needs to perform continuous/discontinuous spectrum shifting according to the notification. For related content of the continuous/discontinuous spectrum shifting, refer to the foregoing description in the specification, and details are not described herein.

When both the uplink signal and the downlink signal use the uplink carrier mapping manner, before sending the downlink signal, the eNB, as the downlink signal transmitter, further needs to perform discontinuous/continuous spectrum shifting on the downlink signal. For related content of the discontinuous/continuous spectrum shifting, refer to the foregoing description in the specification, and details are not described herein.

Because the UE 2 or the LPN 2 receives the downlink signal in the downlink carrier mapping manner by default, before sending the downlink signal, the eNB further needs to notify the UE 2 or the LPN 2 to receive the signal on a carrier that corresponds to the uplink carrier mapping manner.

Correspondingly, the "receiving a communication signal" performed by the UE 2 or the LPN 2 may specifically include: receiving (according to the notification of the eNB) the communication signal at the carrier that corresponds to the uplink carrier mapping manner.

Similar to the foregoing two scenarios, a second scene, which needs to be optimized, in the third scenario lies in a demodulation reference signal mapping manner.

Similar to the foregoing, both the uplink signal and the downlink signal that are transmitted on the same time-frequency resource may use an RE mapping manner of an uplink demodulation reference signal or an RE mapping manner of a downlink demodulation reference signal.

When both the uplink signal and the downlink signal use the RE mapping manner of the downlink demodulation reference signal, because the UE 1 or the LPN 1 sends the uplink demodulation reference signal in the RE mapping manner of the uplink demodulation reference signal by default, before receiving the signal, the eNB further needs to notify the UE 1 or the LPN 1 to perform processing of changing from uplink RE mapping to downlink RE mapping.

Therefore, before the downlink signal is sent, the transmission method performed by the UE 1 or the LPN1 may further include: performing processing of changing from downlink RE mapping to uplink RE mapping (according to the notification of the eNB).

For specific content of the processing of changing from downlink RE mapping to uplink RE mapping, reference may be made to the foregoing description in the specification, and details are not described herein.

When both the uplink signal and the downlink signal use the RE mapping manner of the uplink demodulation reference signal, the eNB further needs to perform processing of changing from downlink RE mapping to uplink RE mapping. For specific content of the processing of changing from downlink RE mapping to uplink RE mapping, reference may be made to the foregoing description in the specification, and details are not described herein.

Alternatively, an RE mapping location of the downlink demodulation RS signal and an RE mapping location of the uplink demodulation RS signal may be kept staggered. In this case, the eNB may further notify the UE 1 or the LPN 1 to perform downlink silencing/low power processing (keeping silent or performing low-power transmitting on an RE on which the downlink demodulation reference signal is transmitted). The eNB performs uplink silencing/low power processing (keeping silent or performing low-power transmitting on an RE on which the uplink demodulation reference signal is transmitted).

To better facilitate subsequent interference cancellation, the eNB may further notify the UE 2 or the LPN 2 to also perform uplink silencing/low power processing.

In addition, in the third scenario, interference cancellation may be further optimized. Because in this scenario, both the eNB and the UE 2 or the LPN 2 need to perform signal demodulation, the eNB further needs to notify the UE 2 or the LPN 2 of demodulation reference information (RE locations of the uplink demodulation reference signal and the downlink demodulation reference signal) and modulation schemes, so that the UE 2 or the LPN 2 uses the demodulation reference information and the modulation schemes during interference cancellation. The eNB or the UE 2 or the LPN 2 may determine, according to whether a received signal is the uplink signal or the downlink signal, a multiple access manner of the signal and whether to use IDFT.

It should be noted that, for the eNB, an interference signal of the eNB is the downlink data signal, and a wanted signal of the eNB is the uplink data signal; therefore, the second interference cancellation needs to be performed. For the UE 2 or the LPN 2, an interference signal of the UE 2 or the LPN 2 is the uplink data signal, and a wanted signal of the UE 2 or the LPN 2 is the downlink data signal; therefore, the first interference cancellation needs to be performed. For related content of the first interference cancellation and the second interference cancellation, reference may be made to the foregoing description in the specification, and details are not described herein.

The fourth scenario is described below. Still referring to FIG. 7, the first base station (eNB 1), the second base station (eNB 2), the UE 1 or the LPN 1 (first UE or a first LPN) served by the eNB 1, and the UE 2 or the LPN 2 (second UE or a second LPN) served by the eNB 2 are involved in the fourth scenario. It should be noted that first and second are merely used for distinguishing.

It can be known from FIG. 7 that the signal receiver includes the eNB 1 and the UE 2 or the LPN 2 that is served by the eNB 2, the downlink signal transmitter includes the eNB 2, and the uplink signal transmitter includes the UE 1 or the LPN 1.

In this embodiment, before sending a signal or receiving a signal, the eNB 1 and the eNB 2 further need to determine, by means of negotiation, a carrier mapping manner and a demodulation reference signal mapping manner.

Similar to the foregoing three scenarios, to perform optimization in terms of carrier mapping, both an uplink signal and a downlink signal that are transmitted on a same time-frequency resource may use a downlink carrier mapping manner or an uplink carrier mapping manner.

When both the uplink signal and the downlink signal use the downlink carrier mapping manner, because the UE 1 or the LPN 1 sends the uplink signal in the uplink carrier mapping manner by default, before receiving the communication signal, the eNB 1 further needs to notify, according to the carrier mapping manner determined by means of negotiation, the UE 1 or the LPN 2 to perform continuous/discontinuous spectrum shifting on the uplink signal.

Therefore, for the UE 1 or the LPN 1, before sending the uplink signal, the UE 1 or the LPN 1 further needs to perform continuous/discontinuous spectrum shifting on the uplink signal according to the notification of the eNB 1. For related content of the continuous/discontinuous spectrum shifting, refer to the foregoing description in the specification, and details are not described herein.

The "receiving a communication signal" performed by the eNB 1 may specifically include: receiving the communication signal on a carrier that corresponds to the downlink carrier mapping manner.

When both the uplink signal and the downlink signal use the uplink carrier mapping manner, before sending the downlink signal, the eNB 2 further needs to perform discontinuous/continuous spectrum shifting on the downlink signal according to the carrier mapping manner determined by means of negotiation. For related content of the discontinuous/continuous spectrum shifting, refer to the foregoing description in the specification, and details are not described herein.

In addition, because the UE 2 or the LPN 2 receives the downlink signal in the downlink carrier mapping manner by default, before sending the downlink signal, the eNB 2 further needs to notify, according to the carrier mapping manner determined by means of negotiation, the UE 2 or the LPN 2 to receive the communication signal on a carrier that corresponds to the uplink carrier mapping manner.

For the UE 2 or the LPN 2, the "receiving a communication signal" performed by the UE 2 or the LPN 2 may specifically include: receiving (according to the notification of the eNB 2) the communication signal at the carrier that corresponds to the uplink carrier mapping manner.

For related content of the discontinuous/continuous spectrum shifting, refer to the foregoing description in the specification, and details are not described herein.

Similar to the foregoing three scenarios, a second scene, which needs to be optimized, in the fourth scenario lies in a demodulation reference signal mapping manner.

To perform optimization, both the uplink signal and the downlink signal that are transmitted on the same time-frequency resource may use an RE mapping manner of an uplink demodulation reference signal or an RE mapping manner of a downlink demodulation reference signal.

When both the uplink signal and the downlink signal use the RE mapping manner of the downlink demodulation reference signal, before receiving the signal, the eNB 1 further needs to notify, according to the demodulation reference signal mapping manner determined by means of negotiation, the UE 1 or the LPN 1 to perform processing of changing from uplink RE mapping to downlink RE mapping.

For the UE 1 or the LPN 1, before the downlink signal is sent, the transmission method performed by the UE 1 or the LPN 1 may further include: performing processing of changing from uplink RE mapping to downlink RE mapping (according to the notification of the eNB 1).

When both the uplink signal and the downlink signal use the RE mapping manner of the uplink demodulation reference signal, the eNB 2 further needs to perform processing of changing from downlink RE mapping to uplink RE mapping according to the demodulation reference signal mapping manner determined by means of negotiation.

Alternatively, an RE mapping location of the downlink demodulation RS signal and an RE mapping location of the uplink demodulation RS signal may be kept staggered.

In this case, the eNB 1 may further notify, according to the demodulation reference signal mapping manner determined by means of negotiation, the UE 1 or the LPN 1 to perform downlink silencing/low power processing; the eNB 2 may perform uplink silencing/low power processing according to the demodulation reference signal manner determined by means of negotiation (keeping silent or performing low-power transmitting on an RE on which the uplink demodulation reference signal is transmitted).

To better facilitate subsequent interference cancellation, the eNB 2 may further notify the UE 2 or the LPN 2 to also perform uplink silencing/low power processing.

For specific content of the uplink RE mapping to downlink RE mapping, the downlink RE mapping to uplink RE mapping, the uplink silencing/low power processing, and the downlink silencing/low power processing, reference may be made to the foregoing description in the specification, and details are not described herein.

In the fourth scenario, interference cancellation may be further optimized. Because in this scenario, both the eNB 1 and the UE 2 or the LPN 2 need to perform signal demodulation, the eNB 2 needs to notify the UE 2 or the LPN 2 of demodulation reference information (RE locations of the uplink demodulation reference signal and the downlink demodulation reference signal) and modulation schemes, so that the UE 2 or the LPN 2 uses the demodulation reference information and the modulation schemes during interference cancellation. The eNB 1 or the UE 2 or the LPN 2 may determine, according to whether a received signal is the uplink signal or the downlink signal, a multiple access manner of the signal and whether to use IDFT.

It should be noted that, for the eNB 1, an interference signal of the eNB 1 is the downlink data signal, and a wanted signal of the eNB 1 is the uplink data signal; therefore, the second interference cancellation needs to be performed. For the UE 2 or the LPN 2, an interference signal of the UE 2 or the LPN 2 is the uplink data signal, and a wanted signal of the UE 2 or the LPN 2 is the downlink data signal; therefore, the first interference cancellation needs to be performed. For related content of the first interference cancellation and the second interference cancellation, reference may be made to the foregoing description in the specification, and details are not described herein.

Corresponding to the transmission method, an embodiment of the present invention further provides a transmission apparatus.

Figure 18:
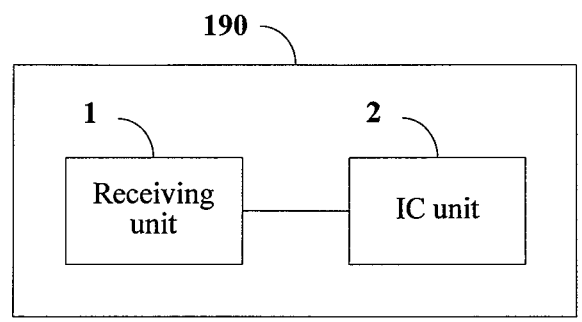
FIG. 18 is a schematic structural diagram of a transmission apparatus according to an embodiment of the present invention.

As a signal receiver, referring to FIG. 18, a transmission apparatus 190 may include:

a receiving unit 1, configured to receive a communication signal, where the communication signal includes an uplink signal and a downlink signal that are transmitted on a same time-frequency resource, the uplink signal and the downlink signal use at least a same carrier mapping manner, the uplink signal corresponds to a first multiple access manner, and the downlink signal corresponds to a second multiple access manner; and an interference cancellation unit (IC unit) 2, configured to perform interference cancellation on the communication signal according to the first multiple access manner and the second multiple access manner.

Figure 19:
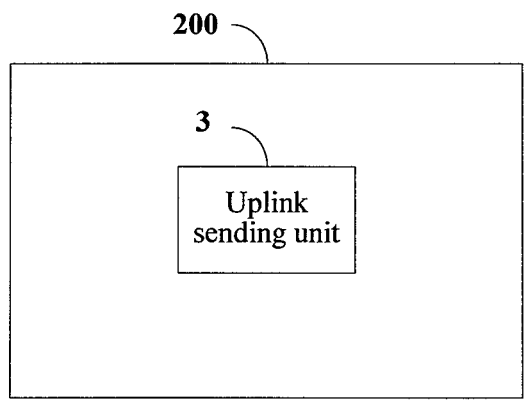
FIG. 19 is another schematic structural diagram of a transmission apparatus according to an embodiment of the present invention.

As an uplink signal transmitter, referring to FIG. 19, a transmission apparatus 200 may include:

an uplink sending unit 3, configured to send an uplink signal, where the uplink signal uses at least a same carrier mapping manner as a downlink signal transmitted on a same time-frequency resource.

Figure 20:
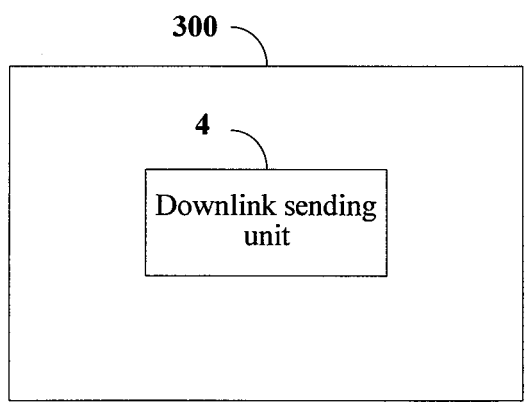
FIG. 20 is still another schematic structural diagram of a transmission apparatus according to an embodiment of the present invention.

As an uplink signal transmitter, referring to FIG. 20, a transmission apparatus 300 may include:

a downlink sending unit 4, configured to send a downlink signal, where the downlink signal uses a same carrier mapping manner as an uplink signal transmitted on a same time-frequency resource.

When the same carrier mapping manner is a downlink carrier mapping manner, in terms of receiving the communication signal, the receiving unit 1 may be specifically configured to: receive the communication signal on a carrier that corresponds to the downlink carrier mapping manner.

Figure 21:
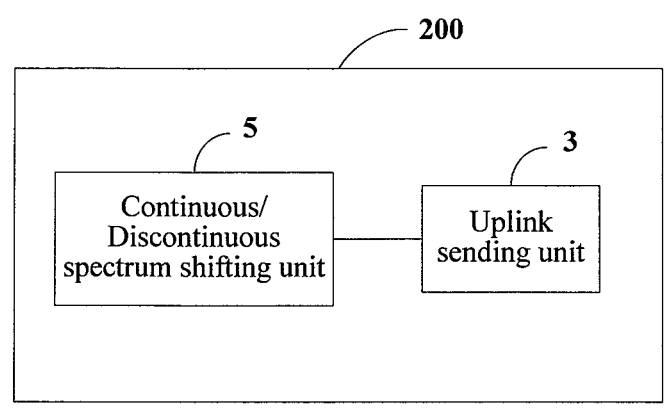
FIG. 21 is still another schematic structural diagram of a transmission apparatus according to an embodiment of the present invention.

Correspondingly, referring to FIG. 21, as the uplink signal transmitter, the transmission apparatus 200 may further include:

a continuous/discontinuous spectrum shifting unit 5, configured to perform continuous/discontinuous spectrum shifting before the uplink sending unit 3 sends the uplink signal, so that a carrier of the uplink signal is shifted to the carrier that corresponds to the downlink carrier mapping manner.

When the same carrier mapping manner is an uplink carrier mapping manner, in terms of receiving the communication signal, the receiving unit 1 may be specifically configured to: receive the communication signal on a carrier that corresponds to the uplink carrier mapping manner.

Figure 22:
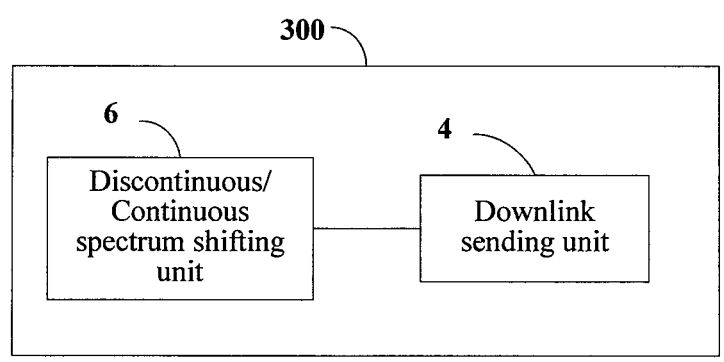
FIG. 22 is still another schematic structural diagram of a transmission apparatus according to an embodiment of the present invention.

Correspondingly, referring to FIG. 22, as a downlink signal transmitter, the transmission apparatus 300 may further include: a discontinuous/continuous spectrum shifting unit 6, configured to perform discontinuous/continuous spectrum shifting before the downlink sending unit 4 sends the downlink signal, so that a carrier of the downlink signal is shifted to the carrier that corresponds to the uplink carrier mapping manner.

For specific content of the discontinuous/continuous spectrum shifting and the continuous/discontinuous spectrum shifting, refer to the foregoing description in the specification, and details are not described herein.

It should be noted that, according to the foregoing descriptions, when both the uplink signal and the downlink signal use the downlink carrier mapping manner, the transmission apparatus corresponding to the uplink signal transmitter may further include a first notification unit, configured to: before the signal receiver sends the uplink signal, notify the signal receiver to receive the signal on the carrier that corresponds to the downlink carrier mapping manner. Alternatively, on the other hand, the signal receiver may further include a second notification unit, configured to: before the communication signal is received, notify the uplink signal transmitter to perform continuous/discontinuous spectrum shifting.

When both the uplink signal and the downlink signal use the uplink carrier mapping manner, the transmission apparatus corresponding to the downlink signal transmitter may further include a third notification unit, configured to: before the downlink signal is sent, notify the signal receiver to receive the signal on the carrier that corresponds to the uplink carrier mapping manner. Alternatively, on the other hand, the transmission apparatus corresponding to the signal receiver may further include a fourth notification unit, configured to notify the downlink signal transmitter to perform, before sending the downlink signal, discontinuous/continuous spectrum shifting.

In addition, in the fourth scenario, the signal receiver (the eNB 1) and the downlink signal transmitter (the eNB 2) each may further include a negotiation unit, configured to determine a carrier mapping manner and a demodulation reference signal mapping manner by means of negotiation.

It is mentioned in the foregoing that the uplink signal and the downlink signal may use a same demodulation reference signal mapping manner.

When both the uplink signal and the downlink signal use an RE mapping manner of a downlink demodulation reference signal, the transmission apparatus 200 corresponding to the uplink signal transmitter may further include an uplink RE mapping to downlink RE mapping unit, configured to perform processing of changing from uplink RE mapping to downlink RE mapping before the uplink sending unit sends the uplink signal.

When both the uplink signal and the downlink signal use an RE mapping manner of an uplink demodulation reference signal, the transmission apparatus 300 corresponding to the downlink signal transmitter may further include a downlink RE mapping to uplink RE mapping unit, configured to perform processing of changing from downlink RE mapping to uplink RE mapping before the downlink sending unit sends the downlink signal.

Alternatively, the uplink signal and the downlink signal may use different demodulation reference signal mapping manners.

When different demodulation reference signal mapping manners are used (an RE mapping location of a downlink demodulation RS signal and an RE mapping location of an uplink demodulation RS signal are staggered), the transmission apparatus 200 corresponding to the uplink signal transmitter may further include a downlink silencing/low power unit, configured to perform downlink silencing/low power processing before the sending unit sends the uplink signal; the transmission apparatus 300 corresponding to the downlink signal transmitter may further include an uplink silencing/low power unit, configured to perform uplink silencing/low power processing before the downlink sending unit sends the downlink signal.

Figure 23:
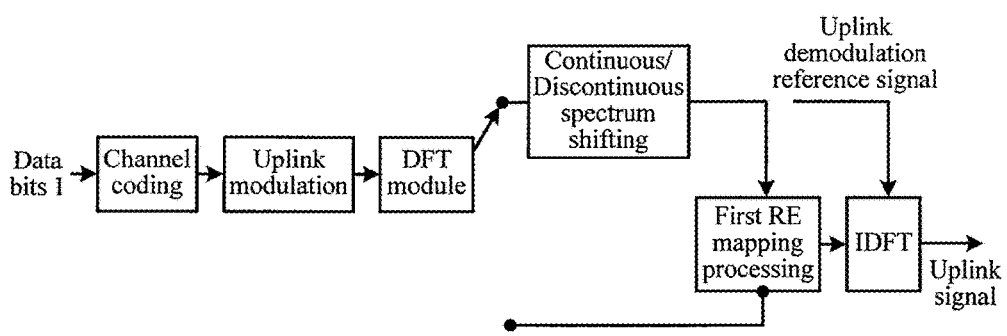
FIG. 23 is a schematic structural diagram of an uplink signal generation unit according to an embodiment of the present invention.

In addition, the transmission apparatus corresponding to the uplink signal transmitter may include an uplink signal generation unit. Referring to FIG. 23, in addition to a conventional channel coding module, uplink modulation module, DTF module, and IDFT module, the uplink signal generation unit further includes a continuous/discontinuous spectrum shifting module (configured to perform the continuous/discontinuous spectrum shifting), a first RE mapping processing module (configured to perform processing of changing from uplink RE mapping to downlink RE mapping or downlink silencing/low power processing), and a continuous/discontinuous spectrum shifting module.

Figure 24:
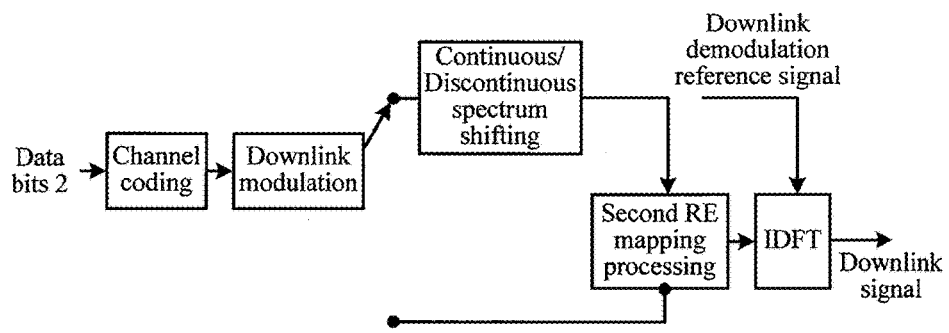
FIG. 24 is a schematic structural diagram of a downlink signal generation unit according to an embodiment of the present invention.

Similarly, the transmission apparatus corresponding to the downlink signal transmitter may include a downlink signal generation unit. Referring to FIG. 24, in addition to a conventional channel coding module, downlink modulation module, and IDFT module, the downlink signal generation unit further includes a discontinuous/continuous spectrum shifting module (configured to perform the discontinuous/continuous spectrum shifting), and a second RE mapping processing module (configured to perform downlink RE mapping to uplink RE mapping or uplink silencing/low power processing).

Figure 25:
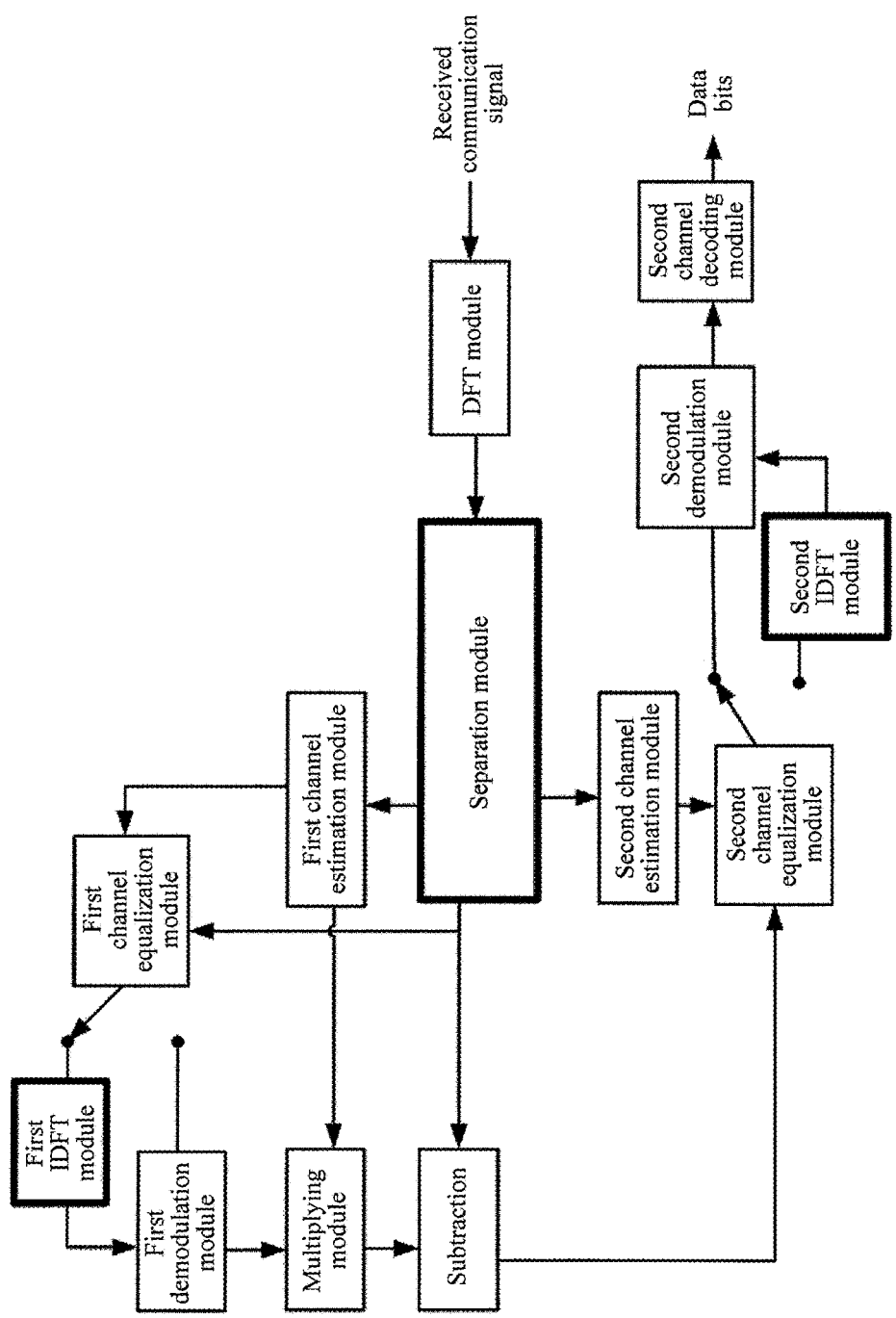
FIG. 25 is a schematic structural diagram of an IC unit according to an embodiment of the present invention.

The IC unit 2 is described below. Referring to FIG. 25, the IC unit 2 may include:

a DFT module, configured to perform discrete Fourier transform (DTF) on the communication signal, to obtain a frequency-domain mixed received signal (step S21);

a separation module, configured to separate, from the frequency-domain mixed received signal, the uplink demodulation reference signal, the downlink demodulation reference signal, and a first data signal that includes an uplink data signal and a downlink data signal (step S22);

a first channel estimation module, configured to perform channel estimation according to the separated uplink demodulation reference signal, to obtain a first channel estimation value H_a~ (step S231), or perform channel estimation according to the downlink demodulation reference signal, to obtain a channel estimation value H_b~ of an interference signal (step S231');

a first channel equalization module, configured to perform channel equalization according to the separated uplink demodulation reference signal and first data signal, to obtain a first equalization result (step S232), or perform channel equalization according to the separated downlink demodulation reference signal and first data signal, to obtain a second equalization result (step S232');

a first IDFT module, configured to perform IDFT on the first equalization result (step S233);

a first demodulation module, configured to demodulate, according to a modulation scheme of the uplink signal, an uplink demodulation signal value on which IDFT has been performed, to obtain an uplink modulation signal estimation value M_a~ (step S234), or demodulate the second equalization result according to a modulation scheme of the downlink signal, to obtain a downlink modulation signal estimation value M_b~ (step S233');

a multiplying module, configured to multiply the uplink modulation signal estimation value by the first channel estimation value, to obtain an estimation value of the interference signal (step S235), or multiply the downlink modulation signal estimation value by the second channel estimation value, to obtain an estimation value of the interference signal (step S234');

a subtraction module, configured to delete the estimation value of the interference signal from the first data signal, to obtain a second data signal (step S24);

a second channel estimation module, configured to perform channel estimation according to the separated downlink demodulation reference signal, to obtain a second channel estimation value H_b~ (step S251), or perform channel estimation according to the separated uplink demodulation reference signal, to obtain a first channel estimation value (step S251');

a second channel equalization module, configured to perform channel equalization according to the separated downlink demodulation reference signal and the second data signal, to obtain a second equalization result (step S252), or perform channel equalization according to the separated uplink demodulation reference signal and the second data signal, to obtain a first equalization result (step S252');

a second IDFT module, configured to perform IDFT on the first equalization result (step S253');

a second demodulation module, configured to demodulate the second equalization result according to the modulation scheme of the downlink signal, to obtain a downlink demodulation signal estimation value M_b~ (step S253), or demodulate, according to the modulation scheme of the uplink signal, a first equalization result on which IDFT has been performed, to obtain an uplink demodulation signal estimation value M_a~ (step S254'); and a second channel decoding module, configured to perform channel decoding on an input signal, to obtain data bits 1 (step S254) or data bits 2 (step S255').

Figure 26:
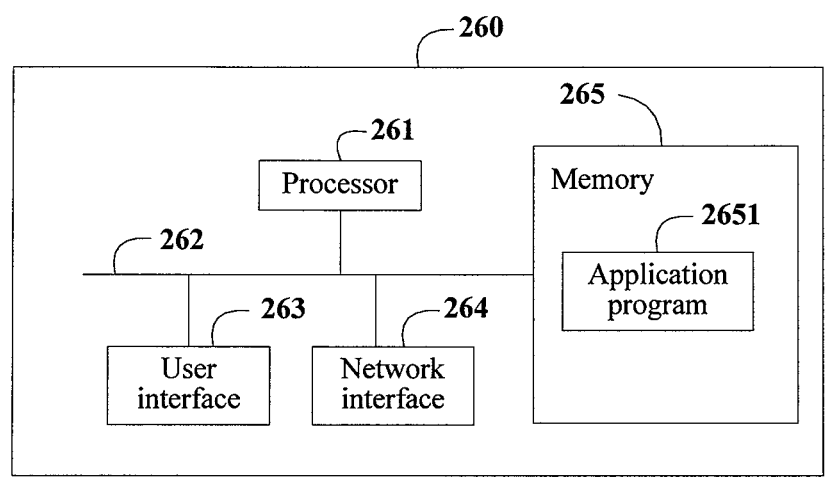
FIG. 26 is still another schematic structural diagram of a transmission apparatus according to an embodiment of the present invention.

FIG. 26 provides a hardware structure of the foregoing transmission apparatus. The transmission apparatus may include: at least one processor 261, for example, a CPU, at least one network interface 264 or another user interface 263, a memory 265, and at least one communications bus 262. The communications bus 262 is configured to implement connection and communication between these components. Optionally, the transmission timing apparatus 260 includes a user interface 263, a keyboard, or a click device, such as a trackball (trackball), a touch panel, or a touchscreen. The memory 265 may include a high-speed RAM memory, or may include a non-volatile memory (non-volatile memory), such as at least one magnetic disk storage. Optionally, the memory 265 may include at least one storage apparatus located away from the processor 261.

In some implementation manners, the memory 265 stores the following elements, executable modules, or data structures, or their subset, or their extension set:

an operating system 2651, including various system programs, configured to implement various basic services and process hardware-based tasks; and an application program module. 2652, including various application programs, configured to implement various application services.

When the transmission apparatus is used as a signal receiver, the application program module 2652 includes, but is not limited to, a receiving unit 1 and an IC unit 2. For specific implementation of modules in the application program module 2652, refer to corresponding modules in the embodiment shown in FIG. 19, and details are not described herein.

When the transmission apparatus is used as a signal receiver, by invoking a program or an instruction stored by the memory 265, the processor 261 is configured to:

receive a communication signal; and perform interference cancellation on the communication signal according to a first multiple access manner and a second multiple access manner.

In addition, the processor 261 can also complete other steps that are performed by the signal receiver described in the method part in the specification, and sub-steps of each step, and details are not described herein.

When the transmission apparatus is used as an uplink signal transmitter, the application program module 2652 includes, but is not limited to, an uplink sending unit 3. For specific implementation of modules in the application program module 2652, refer to corresponding modules in the embodiment shown in FIG. 20 or FIG. 22, and details are not described herein.

By invoking a program or an instruction stored in the memory 265, the processor 261 is configured to:

send an uplink signal, where the uplink signal uses a same carrier mapping manner as a downlink signal transmitted on a same time-frequency resource.

In addition, the processor 261 can also complete other steps that are performed by the uplink signal transmitter described in the method part in the specification, and sub-steps of each step, and details not described herein.

The transmission apparatus is used as a downlink signal transmitter, the application program module 2652 includes, but is not limited to, a downlink sending unit 4. For specific implementation of modules in the application program module 2652, refer to corresponding modules in the embodiment shown in FIG. 21 or FIG. 23, and details are not described herein.

By invoking a program or an instruction stored in the memory 265, the processor 261 is configured to:

send a downlink signal, where the downlink signal uses a same carrier mapping manner as an uplink signal transmitted on a same time-frequency resource.

In addition, the processor 261 can also complete other steps that are performed by the downlink signal transmitter described in the method part in the specification, and sub-steps of each step, and details are not described herein.

The embodiments in this specification are all described in a progressive manner, for same or similar parts in the embodiments, reference may be made to these embodiments, and each embodiment focuses on a difference from other embodiments. The apparatus provided in the embodiments is described relatively simply because it corresponds to the method provided in the embodiments, and for portions related to those of the method, reference may be made to the description of the method.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Through the foregoing description of the embodiments, it may be clearly understood by persons skilled in the art that the present invention may be implemented by software plus necessary universal hardware, where the universal hardware includes a universal integrated circuit, a universal CPU, a universal memory, a universal device, and the like, and definitely may be implemented by application-specific hardware, like an application-specific integrated circuit, an application-specific CPU, an application-specific memory, an application-specific device, and the like, but in many cases, the former one is preferred. Based on such understandings, the essence of the technical solutions of the present invention or the part that makes contributions to the prior art can be embodied in a software product. The computer software product may be stored in a readable storage medium such as a USB flash disk, a mobile hard disk, a read-only memory (ROM), a random access memory (RAM), a magnetic disk, or an optical disc, where the storage medium incorporates several instructions causing a computer device (such as a personal computer, a server, or a network device) to perform the method specified in each embodiment of the present invention.

The embodiments provided above are described to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention is not intended to be limited to these embodiments illustrated in this specification, but shall be construed in the widest scope consistent with the principles and novel features provided in this specification.

What is claimed is:

1. A transmission method, comprising:
   receiving, by a receiver, a communication signal comprising an uplink signal from an uplink signal transmitter and a downlink signal from a downlink signal transmitter transmitted on a same time-frequency resource;
   shifting at least a portion of a spectrum of the uplink signal or of a spectrum of the downlink signal so that the spectrum of the uplink signal and the spectrum of the downlink signal are aligned to use a same carrier mapping manner, wherein the uplink signal corresponds to a first multiple access manner, and the downlink signal corresponds to a second multiple access manner that is different from the first multiple access manner; and
   performing, by the receiver, interference cancellation on the communication signal according to the first multiple access manner and the second multiple access manner.

2. The method according to claim 1, wherein the same carrier mapping manner is a downlink carrier mapping manner or an uplink carrier mapping manner.

3. The method according to claim 1, wherein:
   the uplink signal comprises an uplink demodulation reference signal and an uplink data signal, and the downlink signal comprises a downlink demodulation reference signal and a downlink data signal; and
   the uplink signal and the downlink signal use a resource element (RE) mapping manner of the downlink demodulation reference signal, and in the received communication signal, a resource element (RE) location of the uplink demodulation reference signal is the same as an RE location of the downlink demodulation reference signal, or the uplink signal and the downlink signal use an RE mapping manner of the uplink demodulation reference signal, and in the received communication signal, an RE location of the downlink demodulation reference signal is the same as an RE location of the uplink demodulation reference signal.

4. The method according to claim 1, wherein:
the uplink signal comprises an uplink demodulation reference signal and an uplink data signal, and the downlink signal comprises a downlink demodulation reference signal and a downlink data signal; and
in the received communication signal, an RE location of the uplink demodulation reference signal is different from an RE location of the downlink demodulation reference signal, and in the received communication signal, downlink silencing/low power processing has been performed on the uplink signal, and uplink silencing/low power processing has been performed on the downlink signal.

5. The method according to claim 3, wherein performing the interference cancellation comprises:
performing discrete fourier transform on the communication signal, to obtain a frequency-domain mixed received signal;
separating the uplink demodulation reference signal, the downlink demodulation reference signal, and a first data signal from the frequency-domain mixed received signal, wherein the first data signal comprises the uplink data signal and the downlink data signal;
demodulating the first data signal according to a modulation scheme of the uplink signal or the downlink signal, to obtain an estimation value of an interference signal, wherein the interference signal is the uplink data signal or the downlink data signal;
deleting the estimation value of the interference signal from the first data signal, to obtain a second data signal; and
demodulating the second data signal, to obtain data bits.

6. The method according to claim 5, wherein:
the interference signal is the uplink data signal, the first multiple access is single carrier frequency division multiple access (SC-FDMA), and the second multiple access is orthogonal frequency division multiple access (OFDMA); and
demodulating the first data signal according to a modulation scheme of the uplink signal, to obtain an estimation value of an interference signal comprises:
performing channel estimation according to the uplink demodulation reference signal, to obtain a first channel estimation value,
performing channel equalization according to the uplink demodulation reference signal and the first data signal, to obtain a first equalization result,
performing inverse discrete Fourier transform (IDFT) on the first equalization result, wherein the IDFT corresponds to the SC-FDMA manner,
demodulating, according to the modulation scheme of the uplink signal, a first equalization result on which IDFT has been performed, to obtain an uplink modulation signal estimation value, and
multiplying the uplink modulation signal estimation value by the first channel estimation value, to obtain the estimation value of the interference signal.

7. The method according to claim 6, wherein demodulating the second data signal comprises:
performing channel estimation according to the downlink demodulation reference signal, to obtain a second channel estimation value;
performing channel equalization according to the downlink demodulation reference signal and the second data signal, to obtain a second equalization result;
demodulating the second equalization result according to the modulation scheme of the downlink signal, to obtain a downlink modulation signal estimation value; and
performing channel decoding on the downlink modulation signal estimation value, to obtain data bits.

8. The method according to claim 5, wherein:
the interference signal is the downlink data signal, the first multiple access is single carrier frequency division multiple access (SC-FDMA), and the second multiple access is orthogonal frequency division multiple access (OFDMA); and
demodulating the first data signal according to a modulation scheme of the downlink signal, to obtain an estimation value of an interference signal comprises:
performing channel estimation according to the downlink demodulation reference signal, to obtain a second channel estimation value,
performing channel equalization according to the downlink demodulation reference signal and the first data signal, to obtain a second equalization result,
demodulating the second equalization result according to the modulation scheme of the downlink signal, to obtain a downlink modulation signal estimation value, and
multiplying the downlink modulation signal estimation value by the second channel estimation value, to obtain the estimation value of the interference signal.

9. The method according to claim 8, wherein demodulating the second data signal comprises:
performing channel estimation according to the uplink demodulation reference signal, to obtain a first channel estimation value;
performing channel equalization according to the uplink demodulation reference signal and the second data signal, to obtain a first equalization result;
performing inverse discrete Fourier transform (IDFT) on the first equalization result, wherein the IDFT corresponds to the SC-FDMA manner;
demodulating, according to the modulation scheme of the uplink signal, a first equalization result on which IDFT has been performed, to obtain an uplink modulation signal estimation value; and
performing channel decoding on the uplink modulation signal estimation value, to obtain data bits.

10. A transmission apparatus, comprising:
a receiver configured to receive a communication signal, wherein the communication signal comprises an uplink signal from an uplink signal transmitter and a downlink signal from a downlink signal transmitter that are transmitted on a same time-frequency resource, the uplink signal corresponds to a first multiple access manner, and the downlink signal corresponds to a second multiple access manner that is different from the first multiple access manner; and
a processor coupled to the receiver and configured to:
shift at least a portion of a spectrum of the uplink signal or of a spectrum of the downlink signal so that the spectrum of the uplink signal and the spectrum of the downlink signal are aligned to use a same carrier mapping manner, and
perform interference cancellation on the communication signal according to the first multiple access manner and the second multiple access manner.

11. The apparatus according to claim 10, wherein the same carrier mapping manner is a downlink carrier mapping manner or an uplink carrier mapping manner.

12. The apparatus according to claim 9, wherein:
the uplink signal comprises an uplink demodulation reference signal and an uplink data signal, and the downlink signal comprises a downlink demodulation reference signal and a downlink data signal; and
the uplink signal and the downlink signal use a resource element (RE) mapping manner of the downlink demodulation reference signal, and in the received communication signal, an RE location of the uplink demodulation reference signal is the same as an RE location of the downlink demodulation reference signal, or the uplink signal and the downlink signal use an RE mapping manner of the uplink demodulation reference signal, and in the received communication signal, an RE location of the downlink demodulation reference signal is the same as an RE location of the uplink demodulation reference signal.

13. The apparatus according to claim 9, wherein:
the uplink signal comprises an uplink demodulation reference signal and an uplink data signal, and the downlink signal comprises a downlink demodulation reference signal and a downlink data signal; and
in the received communication signal, an RE location of the uplink demodulation reference signal is different from an RE location of the downlink demodulation reference signal, and in the received communication signal, downlink silencing/low power processing has been performed on the uplink signal, and uplink silencing/low power processing has been performed on the downlink signal.

14. The apparatus according to claim 10, wherein the processor is configured to:
perform discrete Fourier transform on the communication signal, to obtain a frequency-domain mixed received signal;
separate the uplink demodulation reference signal, the downlink demodulation reference signal, and a first data signal from the frequency-domain mixed received signal, wherein the first data signal comprises the uplink data signal and the downlink data signal;
demodulate the first data signal according to a modulation scheme of the uplink signal or the downlink signal, to obtain an estimation value of an interference signal, wherein the interference signal is the uplink data signal or the downlink data signal;
delete the estimation value of the interference signal from the first data signal, to obtain a second data signal; and
demodulate the second data signal, to obtain data bits.

15. The apparatus according to claim 14, wherein:
the first multiple access is single carrier frequency division multiple access (SC-FDMA), and the second multiple access is orthogonal frequency division multiple access (OFDMA); and
the processor is further configured to:
perform channel estimation according to the uplink demodulation reference signal, to obtain a first channel estimation value,
perform channel equalization according to the uplink demodulation reference signal and the first data signal, to obtain a first equalization result,
perform inverse discrete Fourier transform (IDFT) on the first equalization result, wherein the IDFT corresponds to the SC-FDMA manner,
demodulate, according to the modulation scheme of the uplink signal, a first equalization result on which IDFT has been performed, to obtain an uplink modulation signal estimation value, and
multiply the uplink modulation signal estimation value by the first channel estimation value, to obtain the estimation value of the interference signal.

16. The apparatus according to claim 15, wherein the processor is further configured to:
perform channel estimation according to the downlink demodulation reference signal, to obtain a second channel estimation value;
perform channel equalization according to the downlink demodulation reference signal and the second data signal, to obtain a second equalization result;
demodulate the second equalization result according to the modulation scheme of the downlink signal, to obtain a downlink modulation signal estimation value; and
perform channel decoding on the downlink modulation signal estimation value, to obtain data bits.

17. The apparatus according to claim 15, wherein the processor is further configured to:
perform channel estimation according to the downlink demodulation reference signal, to obtain a second channel estimation value;
perform channel equalization according to the downlink demodulation reference signal and the first data signal, to obtain a second equalization result;
demodulate the second equalization result according to the modulation scheme of the downlink signal, to obtain a downlink modulation signal estimation value; and
multiply the downlink modulation signal estimation value by the second channel estimation value, to obtain the estimation value of the interference signal.

18. The apparatus according to claim 17, wherein the processor is further configured to:
perform channel estimation according to the uplink demodulation reference signal, to obtain a first channel estimation value;
perform channel equalization according to the uplink demodulation reference signal and the second data signal, to obtain a first equalization result;
perform IDFT on the first equalization result, wherein the IDFT corresponds to the SC-FDMA manner;
demodulate, according to the modulation scheme of the uplink signal, a first equalization result on which IDFT has been performed, to obtain an uplink modulation signal estimation value; and
perform channel decoding on the uplink modulation signal estimation value, to obtain data bits.

* * * * *